(12) United States Patent
Aithal et al.

(10) Patent No.: US 9,544,181 B1
(45) Date of Patent: Jan. 10, 2017

(54) MULTIPLE-NODE COMMUNICATION LINK MANAGEMENT

(71) Applicant: Dragonwave, Inc., Kanata, Ontario (CA)

(72) Inventors: Prakasha Aithal, Kanata (CA); Alykhan Nathoo, Dunrobin (CA); Geoff Nichols, Dunrobin (CA); Rozita Rafieyan, Kanata (CA)

(73) Assignee: Dragonwave, Inc., Ontario (CA)

( * ) Notice: Subject to any disclaimer, the term of this patent is extended or adjusted under 35 U.S.C. 154(b) by 475 days.

(21) Appl. No.: 13/645,802

(22) Filed: Oct. 5, 2012

Related U.S. Application Data

(60) Provisional application No. 61/543,361, filed on Oct. 5, 2011.

(51) Int. Cl.
*G06F 15/167* (2006.01)
*H04L 12/24* (2006.01)

(52) U.S. Cl.
CPC .................................. *H04L 41/0213* (2013.01)

(58) Field of Classification Search
None
See application file for complete search history.

(56) References Cited

U.S. PATENT DOCUMENTS

| | | | |
|---|---|---|---|
| 7,466,710 B1 * | 12/2008 | Clemm | H04L 41/0873 370/401 |
| 7,881,185 B1 * | 2/2011 | Karl et al. | 370/216 |
| 2003/0021223 A1 * | 1/2003 | Kashyap | 370/217 |
| 2005/0027841 A1 * | 2/2005 | Rolfe | 709/223 |
| 2005/0135418 A1 * | 6/2005 | Betts et al. | 370/469 |
| 2007/0208840 A1 * | 9/2007 | McConville et al. | 709/223 |
| 2010/0146076 A1 * | 6/2010 | Adriazola | H04L 65/4084 709/219 |
| 2011/0106932 A1 * | 5/2011 | Fallon et al. | 709/223 |
| 2012/0219014 A1 * | 8/2012 | Glaeser | 370/468 |
| 2013/0151975 A1 * | 6/2013 | Shadi | G06F 8/60 715/734 |

* cited by examiner

*Primary Examiner* — Chris Parry
*Assistant Examiner* — Stephen Houlihan
(74) *Attorney, Agent, or Firm* — McDonnell Boehnen Hulbert & Berghoff LLP

(57) ABSTRACT

Multiple-node communication link management apparatus and methods are disclosed. Management information is exchanged between a management system and a local communication node over a connection with the local communication node. The management information includes management information associated with the local communication node and management information associated with a peer communication node that communicates with the local communication node through a communication link. Views of the communication link, in its context between the local communication node and the peer communication node, as well as partner and peer partner communication nodes in the case of a related link pair, for example, are provided at the management system. Through the management system and the local communication node, any or all of the communication nodes including the local, peer, partner, and peer partner communication nodes can be managed through the single connection with the communication node.

19 Claims, 34 Drawing Sheets

MULTIPLE-NODE COMMUNICATION LINK MANAGEMENT

CROSS-REFERENCE TO RELATED APPLICATION

This application claims the benefit of U.S. Provisional Patent Application No. 61/543,361, filed on Oct. 5, 2011, and entitled "MULTIPLE-NODE COMMUNICATION LINK MANAGEMENT", the entire contents of which are incorporated herein by reference.

FIELD OF THE INVENTION

This invention relates generally to communications and, in particular, to management of communication links between multiple communication nodes.

BACKGROUND

Traditional communication network management UIs (User Interfaces) include CLI (Command Line Interface), Web interface, EMS (Element Management System) which is usually a GUI (Graphical User Interface) running on a host that interacts with a managed entity, and SNMP (Simple Network Management Protocol) clients. Each one of these UIs has its own merits. For example, Web interface may provide graphical configuration management capabilities, CLI may allow users to exercise greater control into the configuration of a system, and SNMP may provide a mechanism to manage entities through standard SNMP clients which lets one potentially integrate the management plane into a third party management tool.

SUMMARY

According to one aspect of the invention, there is provided an apparatus comprising: a management interface that enables management information to be exchanged with a communication node over a connection with the communication node; and a communication link management module that exchanges the management information with the communication node, the management information comprising management information associated with the communication node and management information associated with a peer communication node that communicates with the communication node through a communication link.

In some embodiments, the apparatus further comprises: a display, the communication link management module providing a view of the communication link in the display.

In some embodiments, the view of the communication link comprises a GUI, the GUI including graphical elements for switching between the communication node and the peer communication node for viewing and changing node configuration, the communication link management module maintaining a context of the view in switching between the communication node and the peer communication node.

In some embodiments, the management information comprises configuration information for changing configurations of the communication node and the peer communication node.

In some embodiments, the connection comprises a HyperText Transfer Protocol (HTTP) connection or a Secure HTTP (HTTPS) connection.

In some embodiments, the communication link management module provides a WebCLI module to enable configuration of the communication node and the peer communication node via CLI over the connection.

In some embodiments, the management information further comprises management information associated with a partner communication node and a peer partner communication node that provide a related communication link that is related to the communication link.

There is also provided a communication node comprising: a management interface that enables management information to be exchanged with a management system over a connection with the management system; a communication interface that enables the communication node to communicate with a peer communication node through a communication link; and a node management module that exchanges, with the peer communication node over the communication link, management information associated with the peer communication node; and exchanges, with the management system over the connection, management information comprising management information associated with the communication node and the management information associated with the peer communication node.

In some embodiments, the node management module discovers the peer communication node through the communication link.

In some embodiments, the node management module further discovers a partner communication node and a peer partner communication node that provide a related communication link that is related to the communication link; receiving, from the partner communication node and the peer partner communication node, management information associated with the partner communication node and the peer partner communication node; and provides to the management system management information associated with the partner communication node and the peer partner communication node.

In some embodiments, the connection comprises an HTTP connection or an HTTPS connection, the node management module multiplexing the connection to the peer communication node.

In some embodiments, a communication system comprises: a management system comprising the apparatus as described above; and a plurality of communication nodes as described above, the plurality of communication nodes comprising at least the communication node and the peer communication node, the management system managing the communication node and the peer communication node through a single connection to either the communication node or the peer communication node.

In some embodiments, the plurality of communication nodes further comprises: a partner communication node and a peer partner communication node that provide a related communication link that is related to the communication link, the management system managing the communication node, the peer communication node, the partner communication node, and the peer partner communication node through a single connection to either the communication node, the peer communication node, the partner communication node, or the peer partner communication node.

According to another aspect of the invention, there is provided a method comprising: establishing a connection with a communication node that participates in a communication link with another communication node; and exchanging management information with the communication node over the connection, the management information comprising management information associated with the communication node and management information associated with the other communication node.

In some embodiments, the method further comprises: providing a view of the communication link, the view comprising a GUI.

In some embodiments, the connection comprises an HTTP connection or an HTTPS connection.

A non-transitory computer-readable medium may be used to store instructions which when executed perform such a method.

A further aspect of the invention provides a method at a communication node, comprising: establishing a connection with a management system for exchanging management information with the management system; establishing a communication link to enable communications between the communication node and another communication node; a node management module that exchanges, with the other communication node over the communication link, management information associated with the other communication node; and exchanges, with the management system over the connection, management information comprising management information associated with the communication node and the management information associated with the other communication node.

A non-transitory computer-readable medium may be used to store instructions which when executed perform the method.

There is also provided a GUI that includes a first graphical element representing a communication node; a second graphical element representing a peer communication node in communication with the communication node through a communication link; and a third graphical element indicating that one of the communication node and the peer communication node is currently being used to exchange, with a management system, management information comprising management information associated with the communication node and management information associated with the peer communication node.

Other aspects and features of embodiments of the present disclosure will become apparent to those ordinarily skilled in the art upon review of the following description.

BRIEF DESCRIPTION OF THE DRAWINGS

Examples of embodiments will now be described in greater detail with reference to the accompanying drawings.

DETAILED DESCRIPTION

A communication link such as a wireless communication link involves more than one communication node. The full context of a wireless communication link might be better understood and appreciated by a user when a UI allows the user to view and manage the communication link as a whole, by managing all of the communication nodes that are involved in the communication link together. Integrating a graphical Web interface with a CLI interface might also enhance the user experience.

Some SNMP managers, for example, provide tools to draw a graphical view of a communication link that involves multiple communication nodes, but this may require a user to explicitly provide the manager with identifications of the nodes involved in the link. Also, the manager may have to establish respective individual connections to the nodes, and, with the exception of SNMP traps which are posted by a node, status data is polled and is not pushed to the manager. Even where a graphical view of a communication link is provided, some existing UIs enable management of only a single managed entity at a time.

Figure 1:
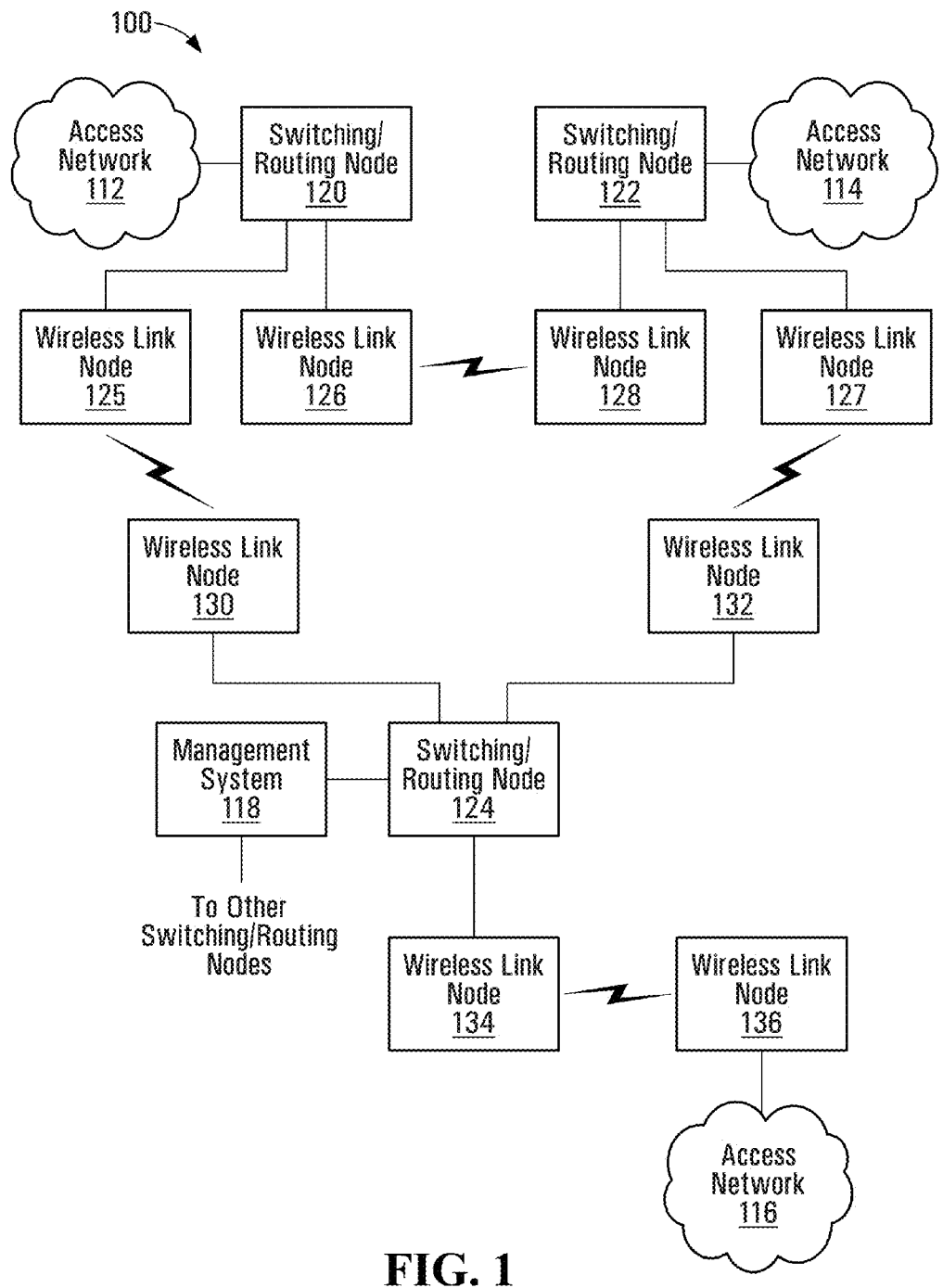
FIG. 1 is a block diagram of an example communication system.

FIG. 1 is a block diagram of an example communication system 100, which includes access networks 112, 114, 116, illustratively LANs (Local Area Networks). Switching/routing nodes 120, 122, 124 that are at least coupled to or form part of the access networks 112, 114, 116 enable communications between the access networks. For a wireless ring/mesh network implementation, the switching/routing nodes 120, 122, 124 are operatively coupled to respective wireless link nodes 125, 126, 127, 128, 130, 132. The wireless link nodes 125, 126, 127, 128, 130, 132 enable the switching/routing nodes 120, 122, 124, and thus the access networks 112, 114, 116, to communicate over wireless communication links. FIG. 1 also shows wireless link nodes 134, 136, to illustrate that wireless communication links might be used not only in the core network, but also in the access networks 112, 114, 116.

Although the access networks 112, 114, 116 may include many nodes, only one switching/routing node 120, 122, 124 per access network is shown in FIG. 1 to avoid overly complicating the drawing. It should also be appreciated that a core network could interconnect many more than the three switching/routing nodes shown. The separation of switching/routing nodes and wireless link nodes as shown in FIG. 1 is also intended to be illustrative and non-limiting. A single communication node could support both wired and wireless communications, for instance. Although separate wireless link nodes as shown in FIG. 1 might enable wired communication links to be replaced with wireless communication links without requiring changes in existing switching/routing nodes, the present disclosure is not in any way limited to application in communication systems where wired and wireless communications are implemented in separate and distinct communication nodes.

A management system 118 is also shown in FIG. 1. In the example communication system 100, the management system 118 is operatively coupled to the switching/routing nodes 120, 122, 124. It should be appreciated, however, that these connections need not be direct physical connections. The management system 118 could be indirectly coupled to one or more routing/switching nodes 120, 122, 124 in order to enable configuration and management of any or all wireless communication links between the wireless link nodes 125/130, 126/128, 127/132, 134/136. In one embodiment, the switching/routing nodes 120, 122, 124 support Internet connectivity, and the management system 118 manages the wireless communication links through Internet connections. In some embodiments, a wireless link node itself supports Internet connectivity without a separate switching/routing node, and the management system 118 could then communicate with the wireless link nodes 125, 126, 127, 128, 130, 132, 134, 136 through Internet connections that do not traverse the switching/routing nodes 120, 122, 124.

Figure 2:
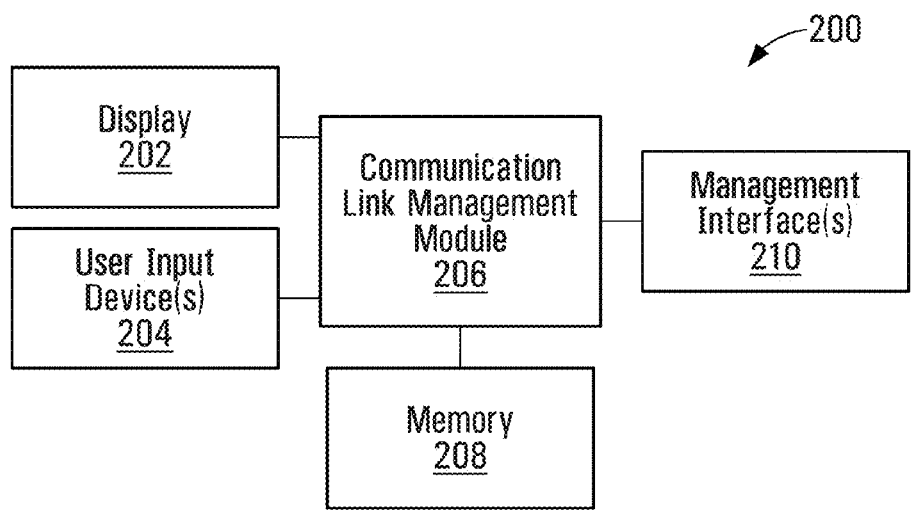
FIG. 2 is a block diagram an example management system.

FIG. 2 is a block diagram of an example management system. The example management system 200 includes a display 202, one or more user input devices 204, a communication link management module 206, a memory 208, and one or more management interfaces 210, operatively coupled together as shown. Equipment in which the example apparatus 200 is implemented, such as a computer system or a Network Management System (NMS) for example, may include additional components that have not been explicitly shown in FIG. 2 in order to avoid overly complicating the drawing. More generally, other embodiments may include further, fewer, or different components which may be interconnected in a similar or different manner than shown.

In one embodiment, the display 202 is a computer monitor or other type of display screen, and the user input device(s) 204 include a mouse or other pointing device and/or a keyboard. A touchscreen could provide both the display 202 and an input device 204.

The memory 208 includes one or more memory devices. One or more solid-state memory devices and/or one or more memory devices having movable or even removable storage media could be implemented.

In the example management system 200, a management interface 210 includes components which support communications with communication nodes that are managed by the management system. Such components include hardware at least in the form of a physical port or connector. Communications with communication nodes could be over any of various types of links, such as through an Ethernet LAN network or an Internet connection. The exact structure of a management interface 210 may, to at least some extent, be implementation-dependent, and could vary depending on the type of connection(s) and/or protocol(s) to be supported.

Hardware, firmware, processing elements which execute software, or some combination thereof could be used in implementing the management interface(s) 210 and/or the communication link management module 206. Devices that might be suitable for this purpose include, among others, microprocessors, network processors, microcontrollers, PLDs (Programmable Logic Devices), FPGAs (Field Programmable Gate Arrays), ASICs (Application Specific Integrated Circuits), and other types of "intelligent" integrated circuits.

The communication link management module 206 enables a user to manage a communication link at the "link level", by coordinating management of multiple managed entities, specifically multiple communication nodes. Although described herein primarily in the context of wireless communication links and nodes, the present disclosure is in no way limited to wireless communications.

Communication link management could involve such features as viewing current status and/or configurations of communication nodes, changing configurations, reading and charting historic or current data samples from the communication nodes, etc.

Figure 3:
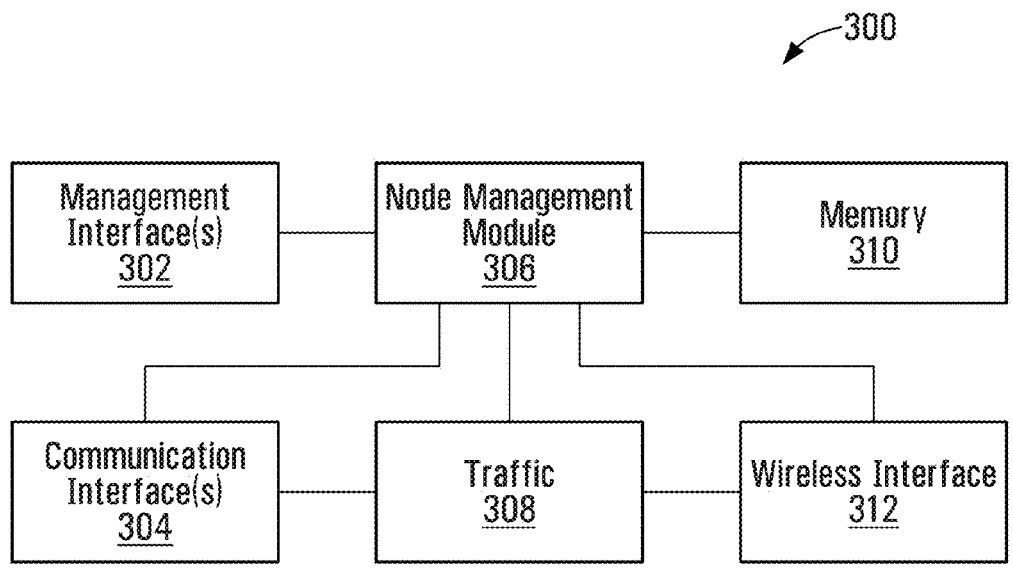
FIG. 3 is a block diagram of an example communication node.

FIG. 3 is a block diagram of an example communication node 300, which includes one or more management interfaces 302, one or more communication interfaces 304, a node management module 306, a traffic processor 308, a memory 310, and a wireless interface 312. As noted above for FIG. 2, an actual communication node in which aspects of the present disclosure are implemented might include further, fewer, and/or different components than those explicitly shown.

In a communication node 300 that is managed by the example management system 200 (FIG. 2), a management interface 302 is compatible with a management interface 210 of the management system. The compatible management interfaces 302, 210 enable the example management system 200 and the example communication node 300 to exchange management information, which might include current status information, current configuration information and/or configuration change information. In some embodiments, management information is exchanged with a management system through a communication interface 304 and/or through a wireless interface 312. Thus, although shown separately in FIG. 3 for illustrative purposes, it should be appreciated that separate and distinct management and communication/wireless interfaces 302, 304, 312 need not necessarily be provided in all embodiments. Both communication traffic and management information could be received and/or transmitted by the example communication node 300 through the same type of interface.

The management interface(s) 302, the communication interface(s) 304, and also the wireless interface 312, like the management interface(s) 210 in FIG. 2, include components such as physical ports or connectors and possibly other components which support communications over communication links. In the case of the wireless interface 312, these components may include at least a wireless modem, a radio, and/or other components that are used in communicating over wireless communication links. For illustrative purposes, the wireless interface 312 is shown in the example communication node 300. Aspects of the present disclosure may, however, also or instead be implemented for management of other types of communication links. As noted above for the management interface(s) 210, the structures of the management interface(s) 302, the communication interface(s) 304, and the wireless interface 312 may be dependent upon the type of connection(s) and/or protocol(s) that are to be supported.

The traffic processor 308 is intended to represent a module that handles communication traffic received by the example communication node 300. In one embodiment, the traffic processor 308 processes Ethernet traffic that is received over an Ethernet communication link through an Ethernet communication interface 304 for transmission over a wireless communication link through the wireless interface 312, and also processes communication traffic that is received over the wireless communication link for transmission over the Ethernet communication link.

Various aspects of communication node operation, such as configuration settings of the wireless interface 312, may be managed by the node management module 306 under control of the example management system 200 (FIG. 2). The node management module 306 might participate in management of not only the example communication node 300, but also operation of peer and partner communication nodes as well. As described in further detail herein, the node management module 306 enables the example management system 200 to manage an entire communication link, including multiple communication nodes that participate in the communication link.

For example, in some embodiments a wireless communication link is provided between the wireless interface 312 and another wireless interface in a peer communication node at the other end of the wireless communication link. The node management module 306 enables the example management system 200 (FIG. 2) to manage not only the "local" communication node 300, but also the peer communication node, by communicating with only the local communication node. Management of the peer communication node is indirect in the sense that the local communication node 300 is an intermediary in management of the peer communication node.

In some embodiments, multiple related communication links are provided, such as redundant working and protection wireless communication links between different communication nodes. The node management module 306 at the local communication node 300 might then interact with its redundant partner communication node through a communication interface 304, with its peer communication node through the wireless interface 312, and with the partner of its peer through the wireless interface and a communication interface at the peer communication node. For example, each communication node could be coupled to its partner through an Ethernet connection, in which case node/peer communications are through a wireless communication link, and node/partner communications are through an Ethernet link.

It should be noted that redundant links represent one example of a multiple-link scenario that involves partner and peer partner communication nodes. In another multiple-link embodiment, communication traffic could be distributed among multiple communication links to aggregate the available bandwidth on those links. Such an aggregation system, like a redundancy protection system, would also involve partner and peer partner communication nodes. Thus, related communication links might include redundant links and/or links that are used in bandwidth aggregation, for example. Other types of related communication links that could be managed together might be or become apparent.

In some embodiments, a Web session between a communication link management system and a managed communication node may include a view aspect which could provide graphical and/or tabular views of the current status of the communication nodes that are participating in a communication link. There may be up to four member communication nodes in a communication link when redundancy features are being used, for example. The view aspect is designed in some embodiments to handle the discovery and display of up to four communication nodes in a communication link.

Figure 4:
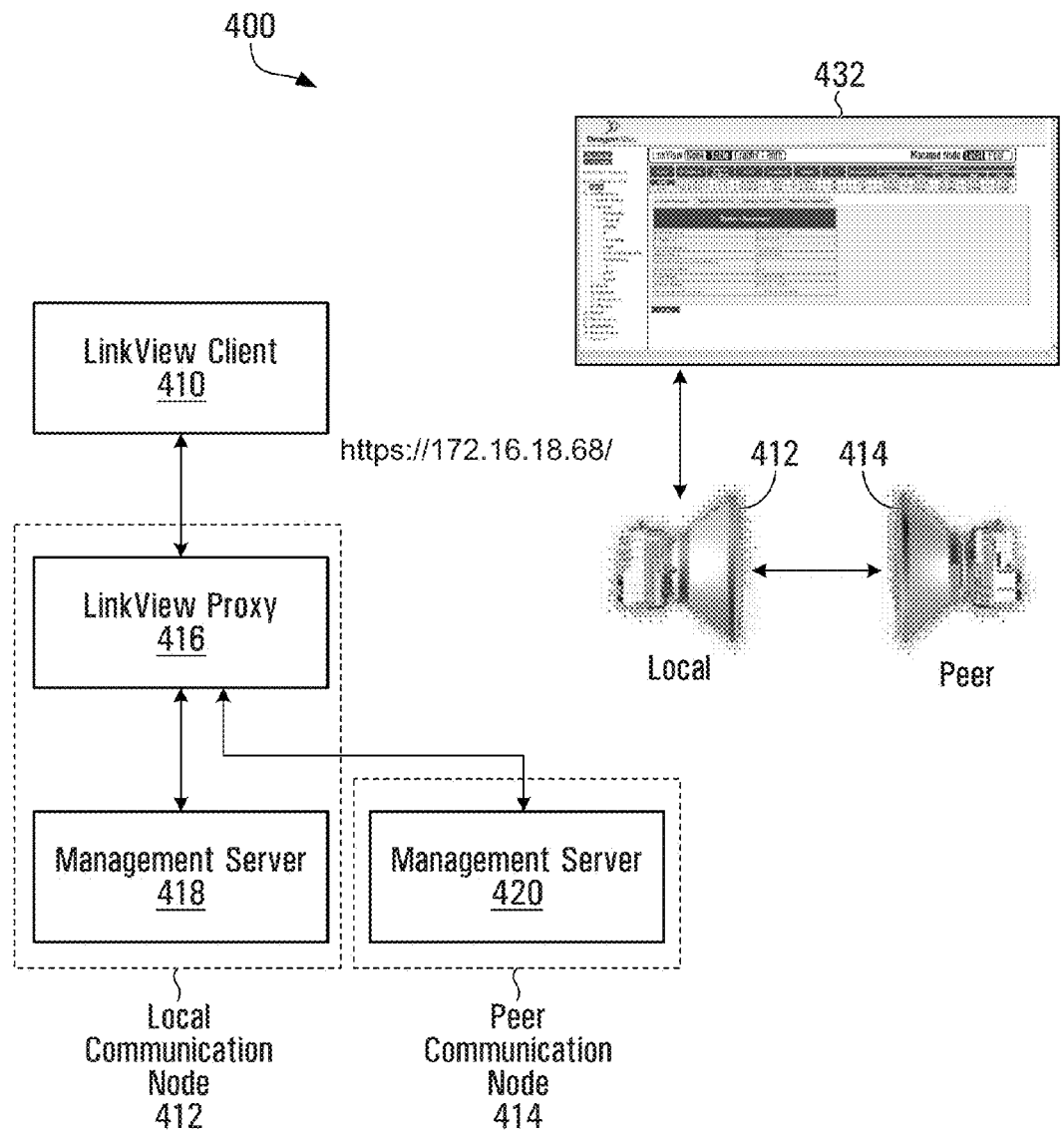
FIG. 4 is a block diagram illustrating an example of a client-server implementation of a view aspect of communication link management.

Components that make up an example management implementation, also referenced herein as "LinkView", are divided into a client side ("LinkView Client") and a server side ("LinkView Proxy" and "Management Apps"), which in some embodiments are implemented using one or more processing elements or devices at each of a management system and a communication node, respectively, which execute software. The client-side software in one embodiment is written in an interpreted language that is native to most Internet Browsers called JavaScript, using a JavaScript framework called jQuery, a widely used and accepted framework for implementing cross-platform web applications. The server-side software is written in C++ in one embodiment. FIG. 4 is a block diagram illustrating an example of a client-server implementation 400 of communication link management.

Figure 8:

The client-side LinkView Client 410 uses a "Push Client" to create a "push connection" in one embodiment in order to create a robust, multi-browser, bidirectional and secure connection between the LinkView Client and the LinkView Proxy 416 at the local communication node 412. The connection is in essence a clear bidirectional pipe between the LinkView Client 410 and the LinkView Proxy 416. In FIG. 4, the LinkView Proxy 416 is implemented at the local and peer communication nodes 412, 414, in this example wireless communication nodes, and the LinkView Client 410 could be implemented at a management system. A Management Server 418, 414 is also implemented at each managed communication node 412, 414. The LinkView Proxy 416 at the local communication node 412, to which a connection is established by a management system, provides for further interaction with the Management Server 418, 420 at each managed communication node 412, 414. A GUI that may be displayed at the management system is also shown in FIG. 4 at 422, and examples thereof are provided below. The GUI 422 corresponds to the example in FIG. 8, and details of that example GUI are shown in FIG. 8.

Figure 6:
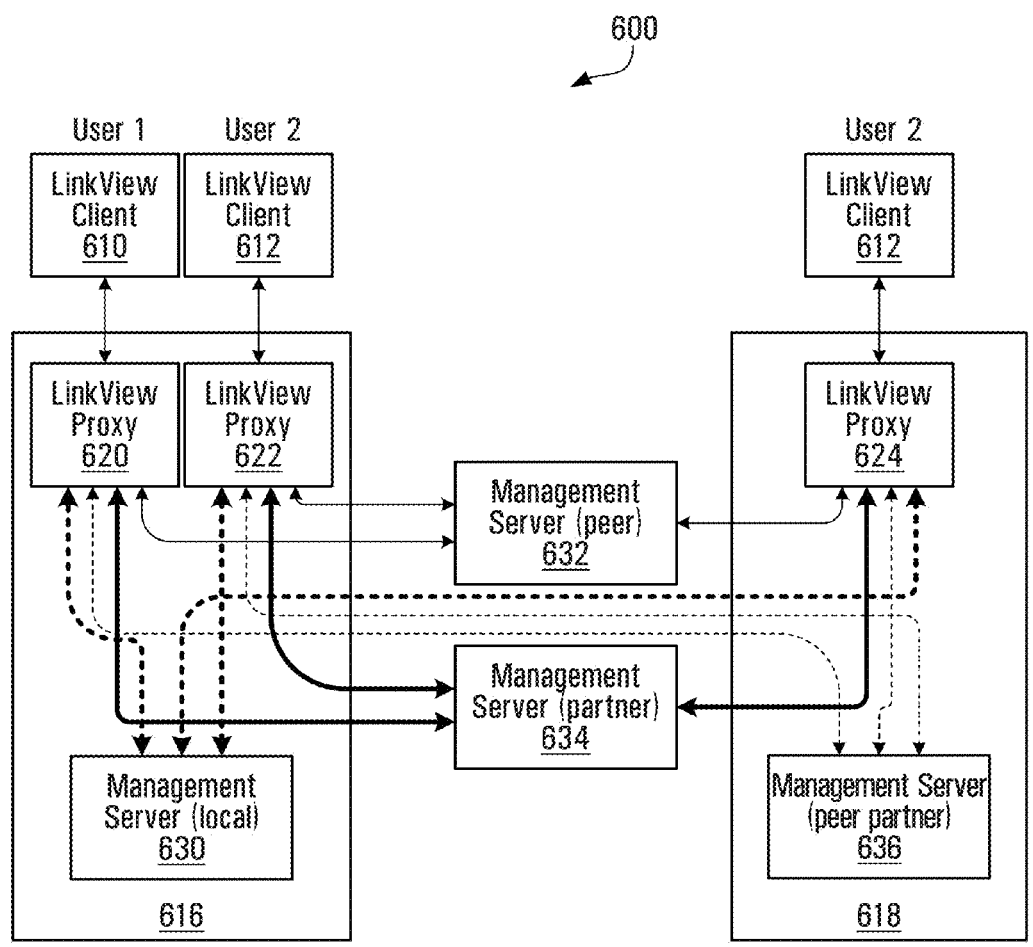
FIG. 6 is a block diagram illustrating three clients in an example of a related pair of communication links involving four communication nodes.

Although FIG. 4 shows a LinkView Proxy 416 at only the local communication node 412, it should be appreciated that a LinkView Proxy could be provided at each communication node 412, 414, enabling users to connect to any communication node that is involved in a communication link. In the example shown in FIG. 4, a user is connected to the local communication node 412, and therefore the LinkView Proxy 416 in the local communication node is illustrated. A user could also or instead connect to the peer communication node 414 through another LinkView Proxy (not shown) at that node. A scenario with multiple LinkView Proxies is illustrated in FIG. 6, for example, which is discussed below.

Figure 5:
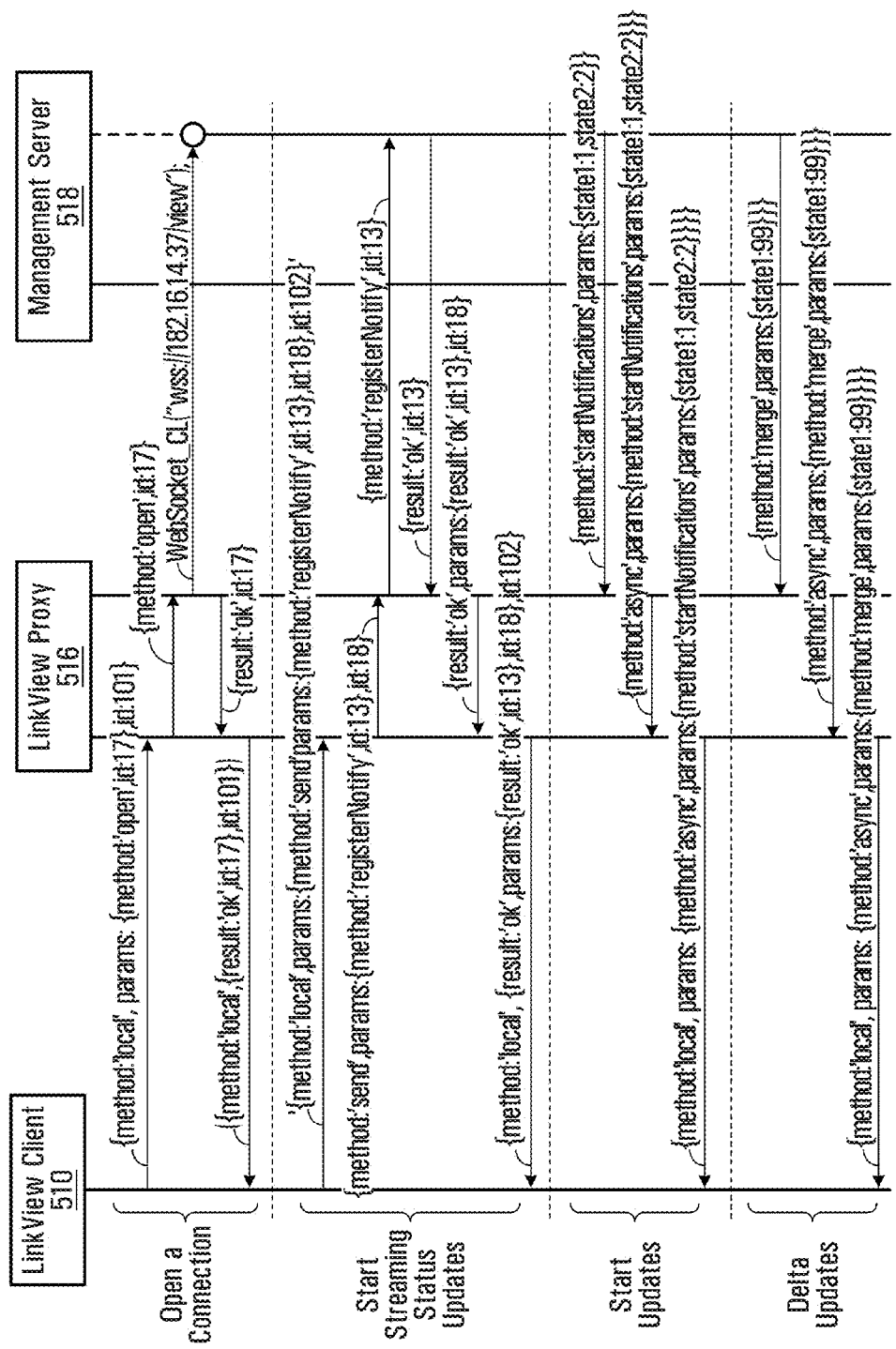
FIG. 5 is a block diagram illustrating an example client-server protocol.

The protocol used between the LinkView Client 410, the LinkView Proxy 416, and the Management Servers 418, 420 in one embodiment is JSON-RPC (JavaScript Object Notation (JSON) Remote Procedure Call (RPC)). The JSON notation and JSON-RPC are widely used. JSON is the native method of serializing and de-serializing JavaScript objects in Web Browsers. FIG. 5 is a block diagram illustrating an example client-server protocol in high level detail:

1. Open a Connection: The LinkView Client 510 at the management system makes a point-to-point connection with the LinkView Proxy 516 at a communication node using the "Push Connection".
2. Start Streaming Status Updates: On successful connection, the LinkView Client 510 sends a JSON-RPC request (a remote procedure call) to the LinkView Proxy 516, to register itself with the Management Server 518 as an observer of all status changes on the local communication node. On successful registration, the LinkView Proxy 516 streams JSON-RPC notifications of all status changes occurring on the communication link.
   a. Start Updates: Send the status of all components.
   b. Delta Updates: Then send only delta (changes).

The LinkView Client 510 processes JSON-RPC notifications and updates the graphical and tabular interfaces according to the new statuses. The status and delta information represent examples of management information that is exchanged between a local communication node and a management system.

A Management Server 518 exists on each communication node in a communication link, and thereby allows a user to connect to any one of the communication nodes to gain full access to all configuration information and all status information for every communication node in the communication link (up to four in the case of a redundant link pair, for example), through the LinkView Proxy 510 on the local communication node.

When a LinkView Client 510 connects to the LinkView Proxy 516 using a "Push Client" API (Application Programming Interface) in one embodiment, a Push Server spawns a new process to handle the incoming LinkView Client JSON-RPC requests. The spawned process is shown in FIG. 5 as the LinkView Proxy 516. The LinkView Client 510 communicates directly with the LinkView Proxy 516 on the local communication node and instructs the LinkView Proxy to open a connection to the locally located Management Server 518 and start to stream updates to the LinkView Client running on a browser at a management system.

The streamed data identifies other discovered communication nodes that are participating in a managed communication link, illustratively by including the IP (Internet Protocol) addresses of the discovered communication nodes. The browser-based LinkView Client 510 at the management system then instructs the LinkView Proxy 516 to connect to the Management Server of each of the discovered communication nodes and start streaming updates from those communication nodes as well. For illustrative purposes, only the Management Server 518 at the local communication node is shown in FIG. 5. The LinkView Proxy 516 interacts with the other Management Server(s) in the same manner as shown in FIG. 5 for the local Management Server 518.

JSON-RPC notifications from each Management Server are multiplexed through the local LinkView Proxy 516 and over the Push connection to the LinkView Client 510. The LinkView Client 510 demultiplexes the JSON-RPC notifications from each Management Server and updates the graphical and/or tabular representations of the communication link.

FIG. 6 is a block diagram illustrating three LinkView Clients 610, 612, 614 in an example 600 of a related pair of communication links involving four communication nodes. In the example shown in FIG. 6, there is a LinkView Client 610, 612, 614 for each of three users logged into two different communication nodes 616, 618. User 1 and User 2 are logged into the "local" communication node 616 (this communication node is local to User 1 and User 2 because that is where they are logged in), and User 3 is logged into the peer partner communication node 618 (i.e., the partner of the peer communication node from the viewpoint of the local communication node 616). Each communication node, including not only the local and peer partner communication nodes 616, 618 but also the partner and peer communication nodes, has one Management Server 630, 632, 634, 636 running as part of a program referenced herein as "Management Apps". Each web session has its own LinkView Proxy 620, 622, 624 to stream updates to the web browser at each LinkView Client 610, 612, 614. Each LinkView Proxy 620, 622, 624 makes a connection to each of the four Management Servers 630, 632, 634, 636 (one at each communication node), so there would be a total of 12 connections established in the example shown, to handle all three users.

From the perspective of each user, there is only one connection between the Web Browser that is running the LinkView Client 610, 612, 614, and the LinkView Proxy 620, 622, 624. The LinkView Proxy 620, 622, 624 handles the multiplexing of the four connections (one to the Management Server 630, 632, 634, 636 of each of the four communication nodes) as if they were tunneled through the single Push connection with each LinkView Proxy.

Referring to FIGS. 2 and 3, a respective communication link management module 206 may implement each LinkView Client 610, 612, 614, a node management module 306 at the local communication node 616 may implement the LinkView Proxies 620, 622 and the Management Server 630, a node management module 306 at the peer partner communication node 618 may implement the LinkView Proxy 624 and the Management Server 636, and a respective node management module 306 at the peer and partner communication nodes 616 may implement the Management Servers 632, 634.

Figure 7:
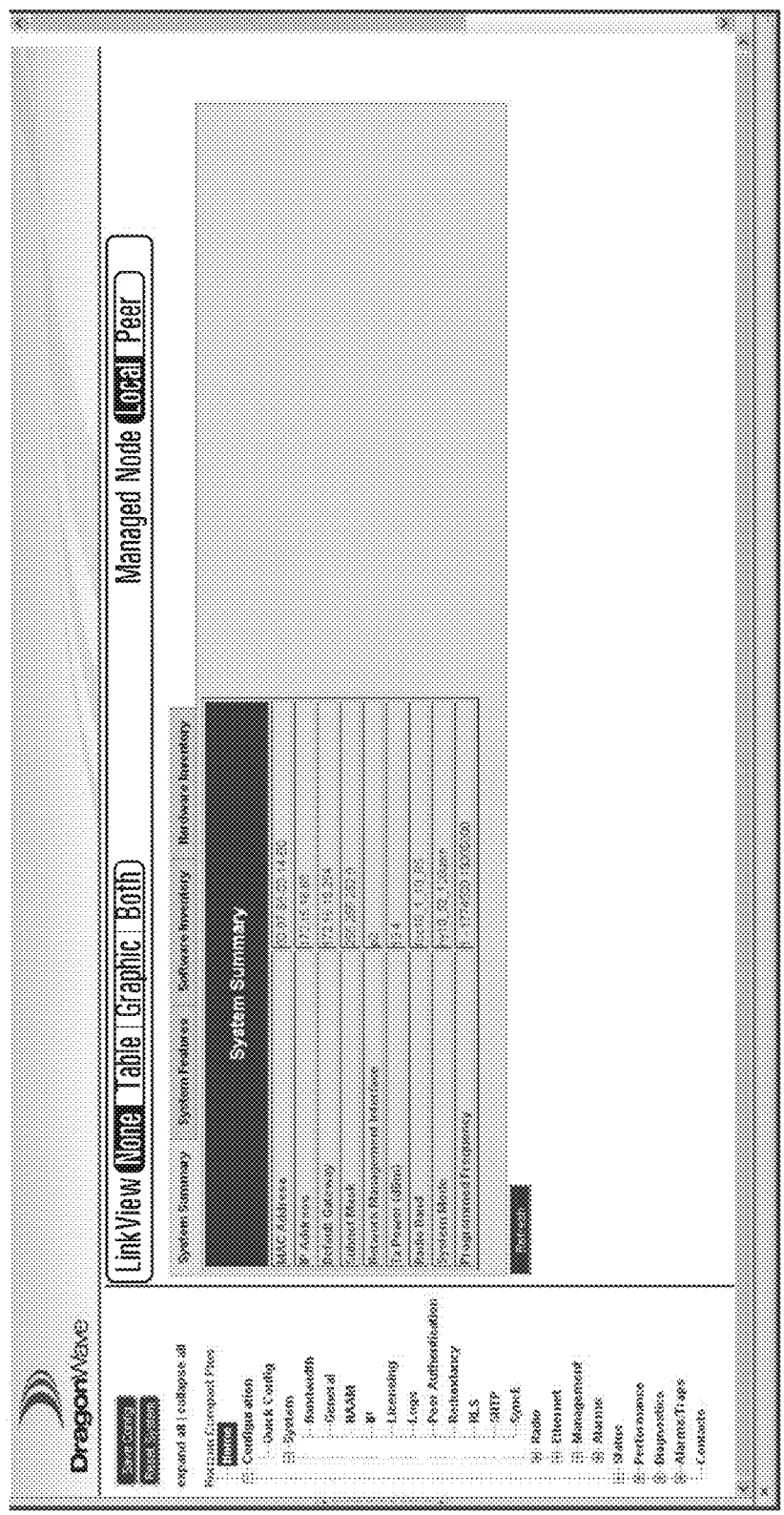
FIGS. 7 to 14B include example GUIs.

The view aspect of a Web session provides various views of the current status of a communication link as a whole. FIG. 7 illustrates an example GUI. The example GUI includes a view control button set with functional graphical elements that control the view of a communication link that is displayed to a user. The view control button set includes the following buttons in the example shown: None, Table, Graphical, Both. Each of these views shows a subset of status information dynamically. In all views, text and/or background colours could be changed momentarily to call the user's attention to changing status values. The user is also made aware of the node context by highlighting the "Managed Node" node name (Local/Peer in this example), and a representation of the node itself in a node graphical view discussed below.

The 'None' graphical element provides a minimal view of communication node status, where status information for a communication node rather than a communication link is displayed to a user. This could be useful, for example, when the user has minimal screen space and is more interested in communication node configuration pages. The 'None' view is shown in FIG. 7.

The Table graphical element offers a tabular view of a communication link and its participating "member" communication nodes. The example GUI illustrated in FIG. 8 relates to a single link configuration, and accordingly there are two rows in the table, including a respective row for the communication node at each end of the communication link. Each cell in the table has a clickable hyperlink graphical element in this example, which takes the user to the relevant configuration page that manages that particular component. The columns of the table are in the example shown in FIG. 8 are:

Name—The name of each communication node, in reference to which communication node in the communication link is currently being managed in the configuration pages shown below the table.

IP Address—The IP Address of each communication node.

Alarms (C-M-m)—The current counts of alarms for each communication node. There are three positive integers (including 0) in this example, indicating the number of alarms in each of the three severity levels. Critical alarms are represented by "C", Major alarms are represented by "M" and minor alarms are represented by "m".

ATPC (Automatic Transmit Power Control)—This column indicates the current ATPC status. In this case, the ATPC feature has not been configured and therefore the status is "disabled". When this feature is active the ATPC status is updated continuously according to ATPC status changes.

Loopback—This column shows the loopback status for each communication node. In this example, the loopback has not been enabled.

HAAM (Hitless Automatic Adaptive Modulation)—This column indicates the status of the HAAM feature for each system. When this feature is active the HAAM status is updated continuously according to HAAM status changes.

RLS (Rapid Link Shutdown)—This column indicates the status of an RLS feature for each communication node. When this feature is active, the RLS status is updated continuously according to RLS status changes. RLS is disclosed, for example, in U.S. National Phase patent application Ser. No. 11/793,680, with an International filing date of Dec. 15, 2005, and entitled "WIRELESS COMMUNICATION PATH MANAGEMENT METHODS AND SYSTEMS", the entire contents of which are incorporated herein by reference.

Redundancy—This column indicates the status of redundancy protection for each communication node. When this feature is active, the redundancy status is updated continuously according to redundancy status changes. Arrangements as disclosed, for example, in U.S. patent application Ser. No. 12/457,286, filed Jun. 5, 2009, and entitled "APPARATUS AND METHODS FOR AGGREGATION OF COMMUNICATION BANDWIDTH OVER MULTIPLE WIRELESS COMMUNICATION LINKS", the entire contents of which are incorporated herein by reference, could provide redundancy protection.

Wireless Port—This column shows the following wireless port information for each communication node:
  TX Pwr—The current transmit power for each communication node.
  Mod—The current modulation for each communication node.
  RSL—The current Receive Signal Level for each communication node.
  SNR—The Signal to Noise Ratio for each communication node.
  $E_b/N_0$—The energy per bit to noise power spectral density ratio for each communication node.

The graphical view of a communication link, accessible through the Graphic graphical element, offers more detail than the tabular view. The additional information can be seen in FIGS. 9 and 10, for example. In the graphical view mode shown in FIG. 9, the tabular view is hidden. By selecting the Both graphical element, both the graphical view and the tabular view are displayed, as shown in FIG. 10.

Figure 9:
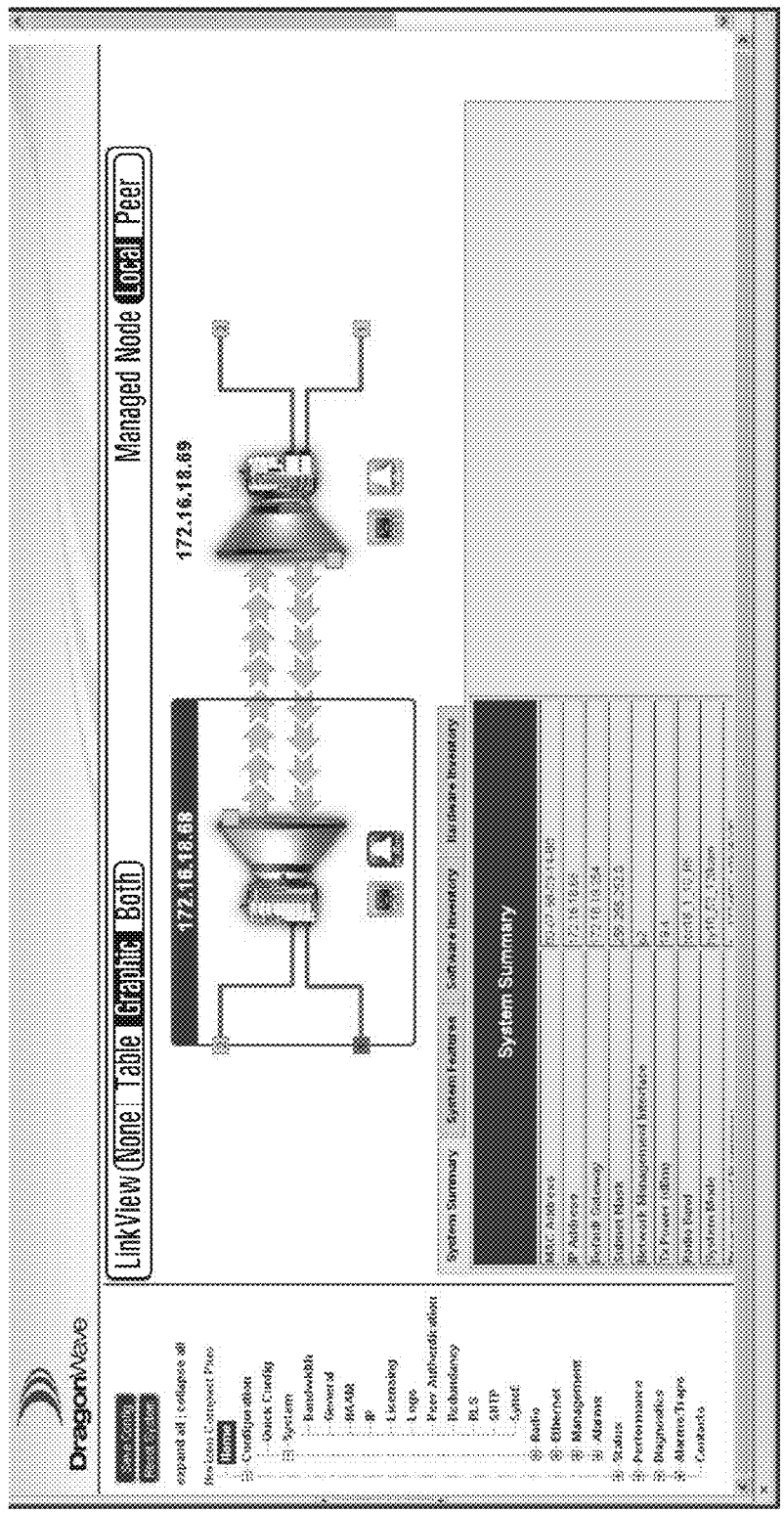
Figure 10:
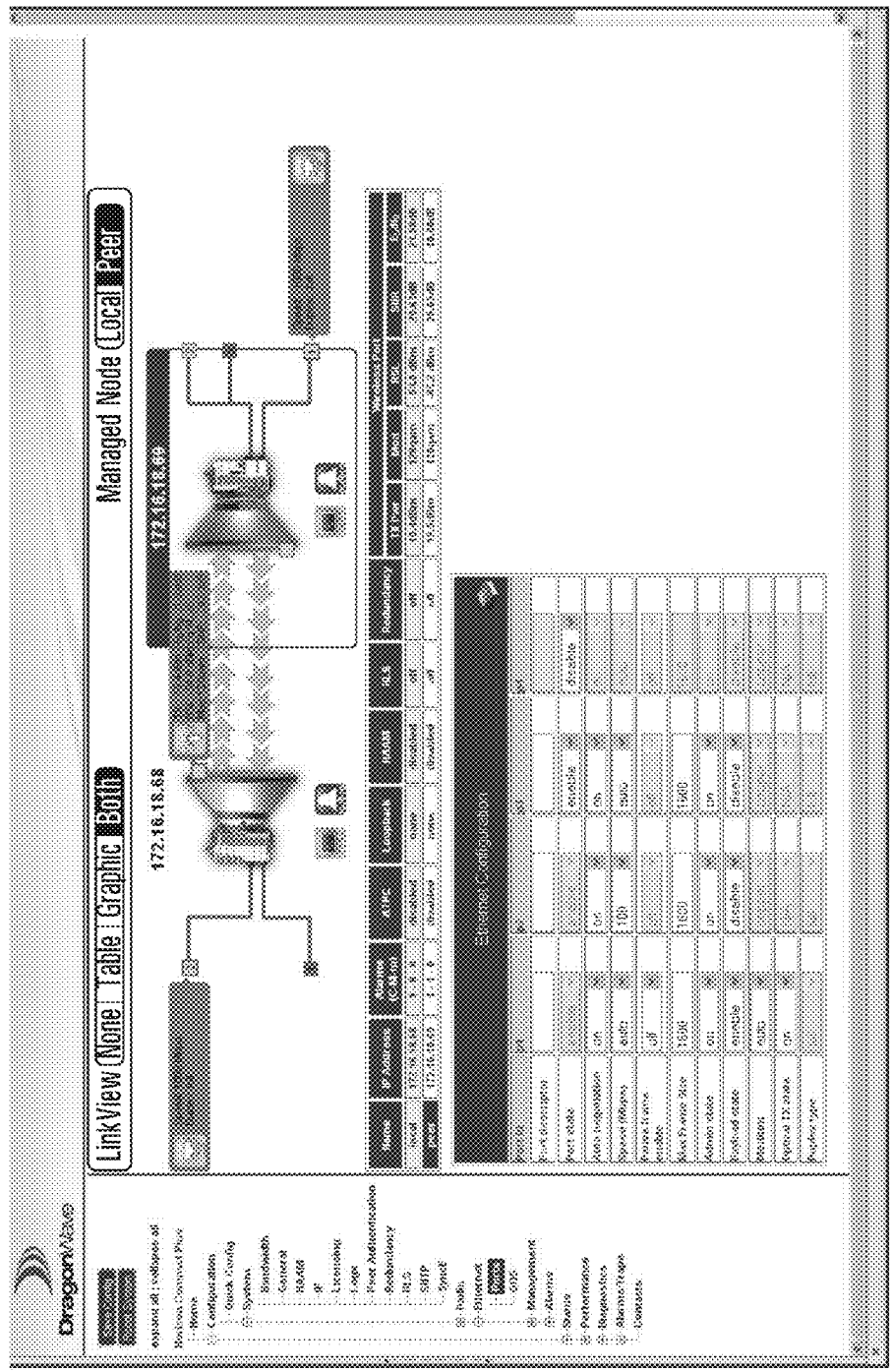

The example GUI in FIG. 9 shows two boxes with representations of local and peer wireless communication nodes within them. Each box shows the IP Address of the communication node for identification, and two icons. An alarm icon changes color depending on the current alarm status of each communication node (Red, Amber, Yellow, Green for Critical, Major, Minor and no alarms, respectively, in one embodiment). When hovering over this icon, a hyperlink becomes available to take the user to an alarm detail page. A WebCLI icon is also available for each communication node, and allows the user to open a CLI session with the associated communication node. When the user hovers over the WebCLI icon, a hyperlink becomes visible and when clicked a WebCLI session is opened.

The background of the unselected communication node (the peer in this example) is clickable, allowing the user to change the Managed Node from "Local" to "Peer" and vice-versa. For example, if the Managed Node is "Peer" then the configuration pages in the left and bottom panes are strictly associated with the "Peer" communication node.

Each box also has a network side and a wireless side in the example shown:
  In one embodiment, the network side can have two, three or four interfaces that are shown in the graphic view as they are dynamically enabled. In FIG. 9 both communication nodes show the existence of two network interfaces. When the network interfaces are copper pair interfaces, they can be independently split into two ports with a special splitter. Port splitting may be used in some embodiments to increase the number of ports, although in other embodiments more than four regular Ethernet ports could be provided. FIG. 10 shows the peer node having its port 2 split into two interfaces, while port 1 remains un-split and maintains a 1000 Mbps speed. These interfaces are labeled 1 and 2 on the local communication node and 1 through 3 on the peer communication node. The interfaces are terminated with a green or red box called a "handle". The colour of the handle indicates whether the port is up or down. For example, when an Ethernet cable is disconnected from the peer port 3 in FIG. 10, the port colour turns red.
  The wireless side is shown at the antenna side of each communication node. The wireless port also has a handle that changes colour to red when the modulation synchronization or "Mod-Sync" is lost, in one embodiment. In FIGS. 9 and 10, the wireless ports are "up" as could be shown by green boxes at the handles. Each wireless interface also has two sets of arrows egressing and ingressing the wireless port:
    Egressing arrows—These arrows show that a communication node is transmitting to its peer. The arrows could be green indicating that the transmitter is on. Egressing red arrows could be used to indicate that the transmitter is currently not transmitting (the communication link will be down in this case).
    Ingressing arrows—These arrows indicate that communication traffic is being received from the peer communication node.

Each of the handles can be hovered over and clicked in some embodiments. FIG. 10 shows information bubbles that become visible when hovering over an interface handle. The Local port 2 handle was clicked and an information bubble was posted and shows the type of connection with an icon, GE (Gigabit Ethernet) in this example, and the current (negotiated) speed of the interface. The icon also changes colour when the port is disconnected, in some embodiments. The wireless interface handle shows more information about the wireless link status including the Transmit Power and the Receive Signal Level—both important status indicators of a healthy communication link.

Each of the informational bubbles that the user can post has a set of status values that are continuously updating. In some embodiments, each status displays as a hyperlink when hovered over and when clicked will take the user to the relevant configuration pages, an example of which is shown in FIG. 10 beneath the tabular view.

Figure 11:
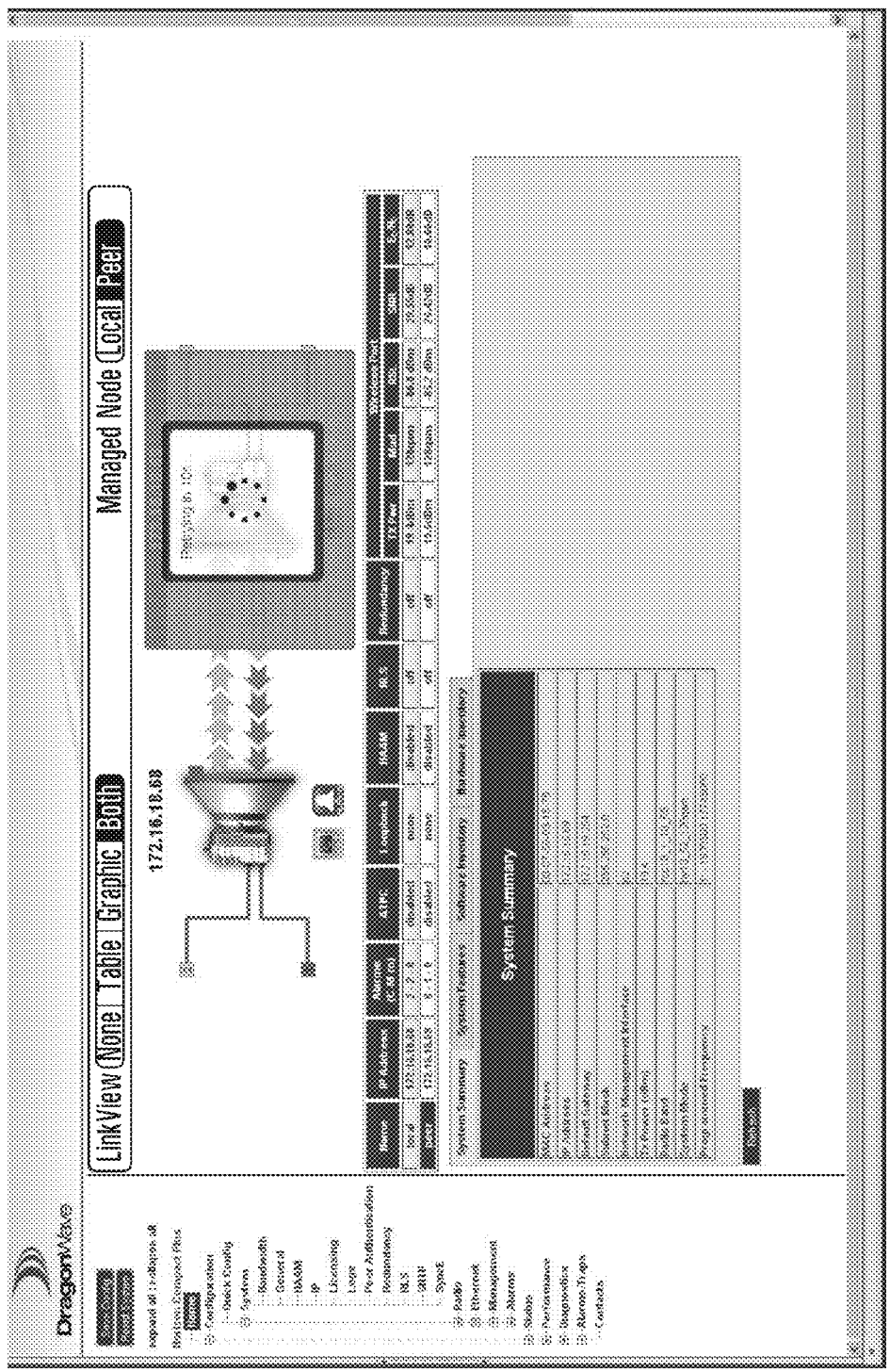

FIG. 11 shows another example GUI, in a case where the wireless communication link has lost Mod-Sync. In this case, the peer communication node was reset, resulting in the loss of signal from the peer. An informational overlay appears over the peer communication node representation, with a rotating wheel indicating that the connection was dropped and that an attempt will be made to re-establish the connection in 10 seconds. The wireless handle and the ingress arrows could be displayed in red, indicating there is no communication traffic being received from the peer communication node. The Egressing arrows could be displayed in green to indicate that the local communication node is still transmitting.

Also in FIG. 11, new alarms are present, and this could result in the alarm icon changing colour according to the highest severity condition present. In this case the communication link is down, which is a critical alarm in some embodiments.

Figure 12:
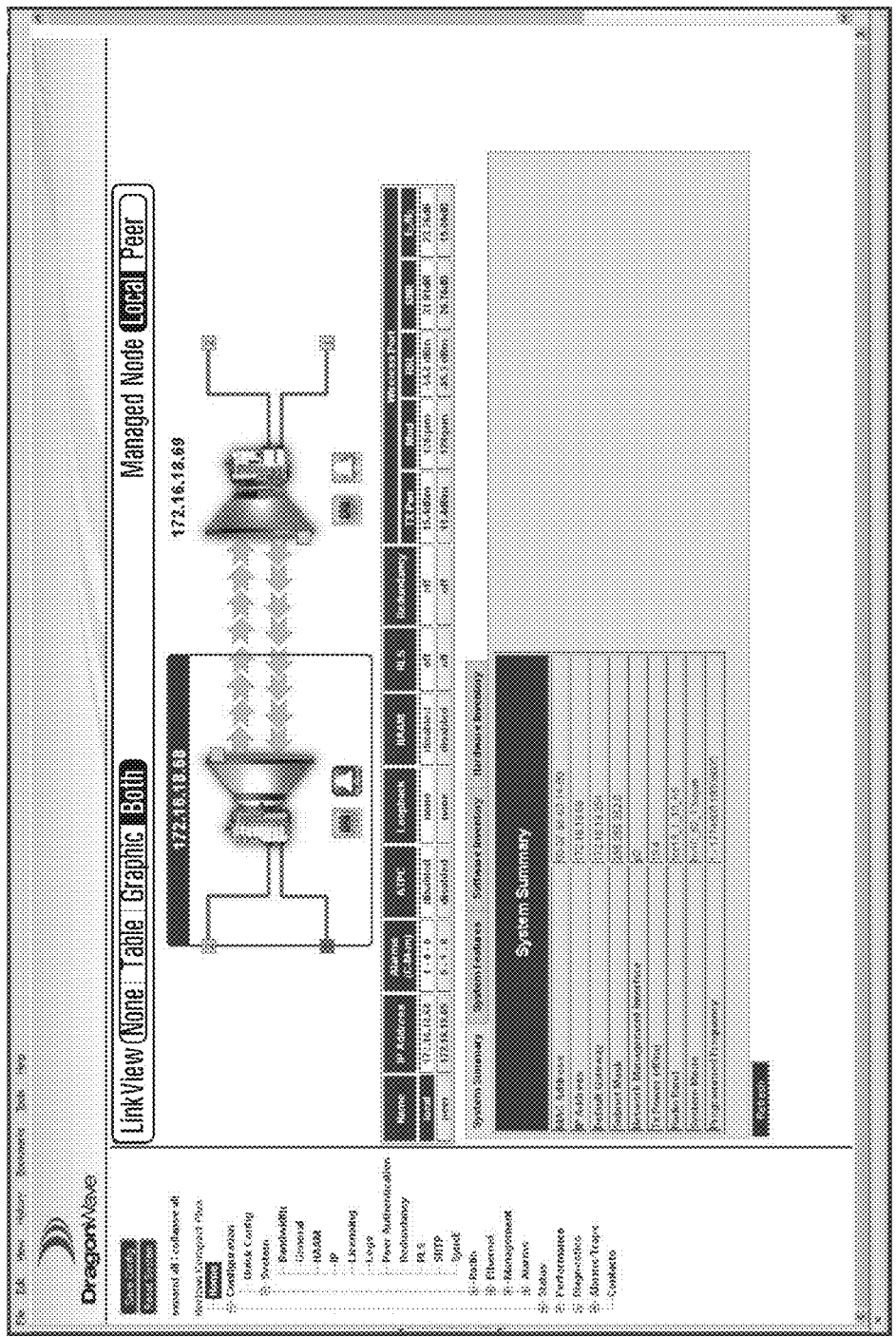

The Both graphical element displays a view that provides the user with a dual tabular and graphical view of the communication link, as shown in FIG. 12. There is some overlapping information in the two views, and both views are updated simultaneously in some embodiments.

Figure 13:
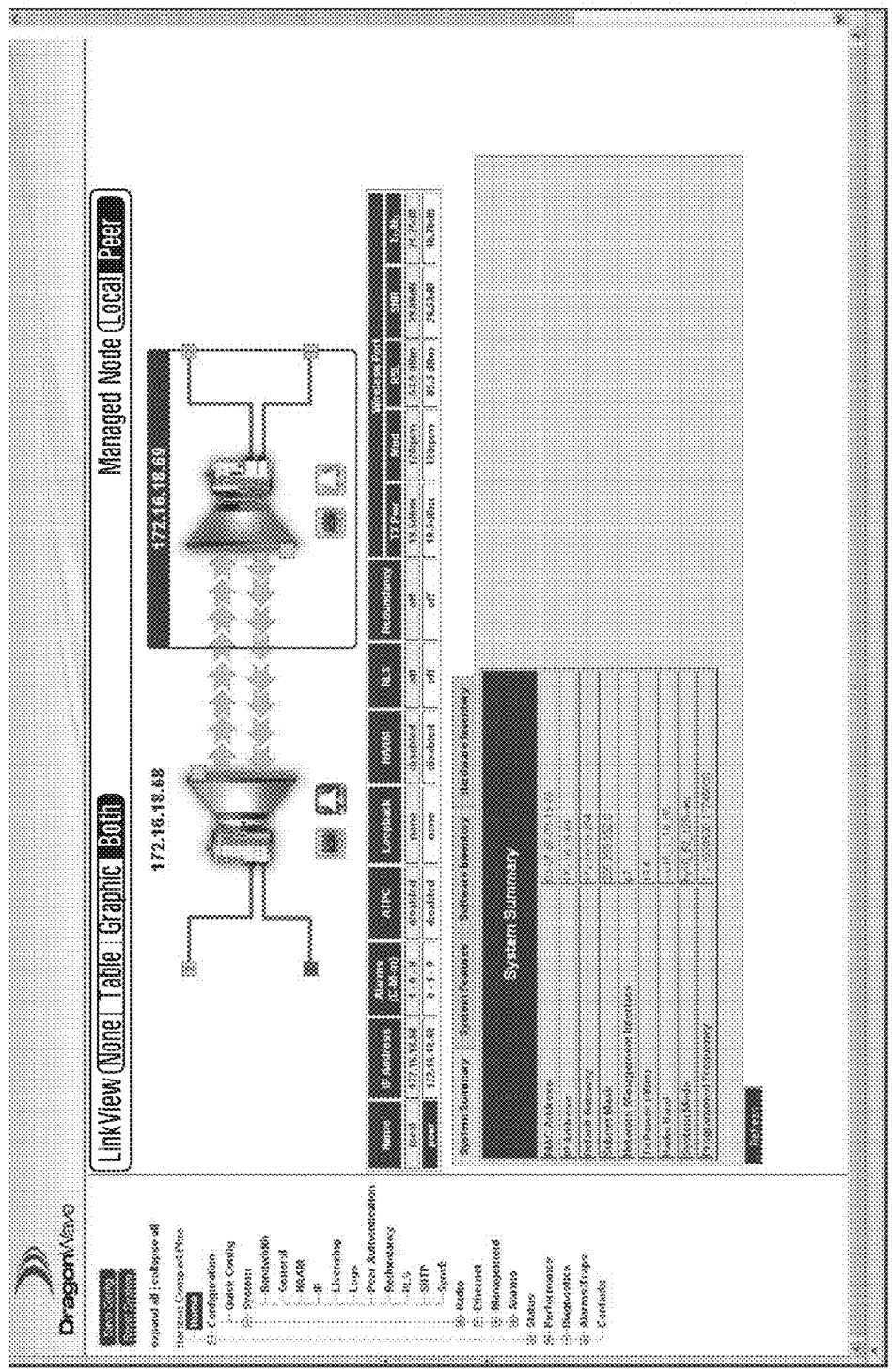

The example GUIs in FIGS. 7 to 12 also include a Managed Node selector with Local and Peer graphical elements. When the user has decided to hide the Table and Graphical views as shown in FIG. 7, the currently selected or "managed" communication node is operated on by clicking on the Managed Node button set. For a single link, there are only two nodes to manage: the "Local" side (the communication node that this Web session is connected to) and the "Peer" side. Both communication nodes can be fully managed by selecting the desired page from the tree hierarchy on the left pane and viewing and configuring the subsystem in the bottom pane. The Managed Node button set shows which communication node is currently being managed. In the example of FIG. 13, the Peer communication node is being managed.

Switching between managed nodes can instead be accomplished by selecting a communication node to manage, in either the graphical view or the tabular view.

In switching between managed nodes, node context can be maintained. For example, the user can click on any communication node in the graphical view, and the currently displayed configuration tabs switch context to that node. From then on, all configuration changes are applied to that communication node. For example, in FIG. 13, when the user has clicked on the node with IP address 172.16.18.69, any configuration page that the user navigates into will belong to this communication node and all configuration changes that are made will be applied to that communication node. Also, as can be seen from a comparison of FIGS. 12 and 13, which illustrate a switch between the local and peer communication nodes as the managed node, current context is maintained. In FIG. 12, the System Summary configuration page is displayed in the context of the local communication node, and the same System Summary configuration page (but for the peer communication node) is displayed after the managed node is switched to the peer communication node.

Communication link management may involve not only viewing of current configuration and status information, but also configuration changes. Some embodiments provide an integrated Web and CLI interface to manage a communication link. With reference to the example GUI shown in FIG. 14A, a user connects to a communication node through a Web interface, by launching a web connection to 172.16.18.68. The local node at IP address 172.16.18.68 automatically detects its peer at IP address 172.16.18.69, in this example of a single communication link configuration. In a redundancy configuration, the local communication node 172.16.18.68 also automatically detects its partner communication node, and the partner's peer node.

Figure 14A:
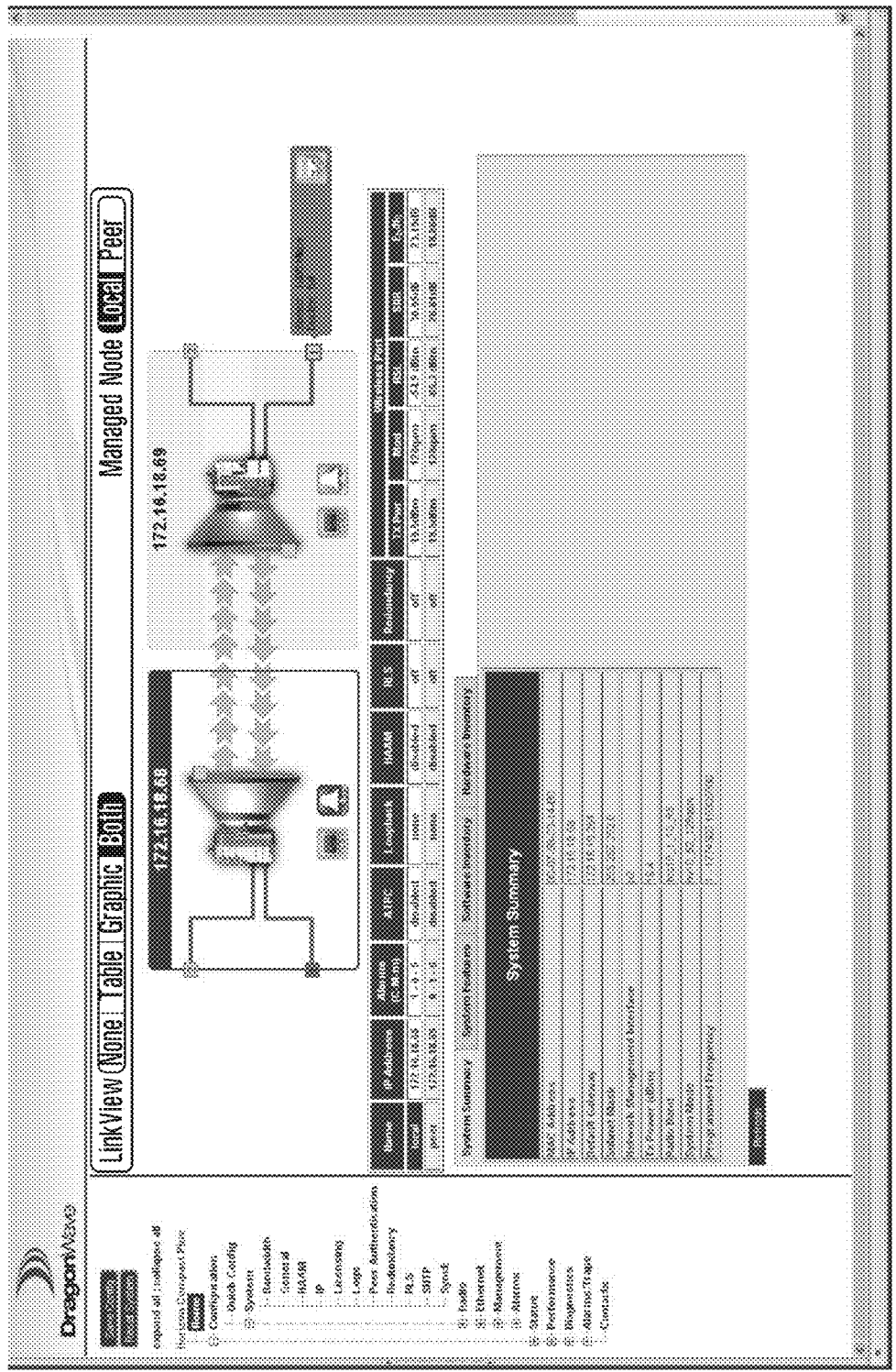

Both the local communication node and the peer communication node (and the partner and peer partner communication nodes in a redundancy configuration, for example) are managed through one Web connection to any one of the communication nodes participating in the communication link. In FIG. 14A, the peer communication node at IP address 172.16.18.69 is managed through the local communication node at IP address 172.16.18.68. No separate Web (HTTP—HyperText Transfer Protocol) connection to the peer communication node is created.

The context of the entire communication link is shown through graphical and tabular views of the communication link in FIG. 14A. The peer communication node at 172.16.18.69 is detected through the wireless communication link and is shown in the example GUI. The wireless interconnection is also shown in the example GUI.

Additional graphical elements may be provided in a GUI. Since both the local and peer communication nodes are managed through the same connection in the example GUI of FIG. 14A, for instance, it might be useful to provide a user with an indication as to the source port of a current management session. Such an indication could be provided by way of a special icon or other element. In the example GUI of FIG. 14B, the source port for the current management session is denoted by the text "MGMT" at port 2 of the local communication node at IP address 172.16.18.68. In the example shown, a "MGMT" label or indicator is also provided on the representation of the wireless port of the peer communication node at IP address 172.16.18.69. This type of indication could be very useful to the user in deciding which communication node in a communication link should be reset first for reset dependent configuration changes or settings to take effect.

Figure 14B:
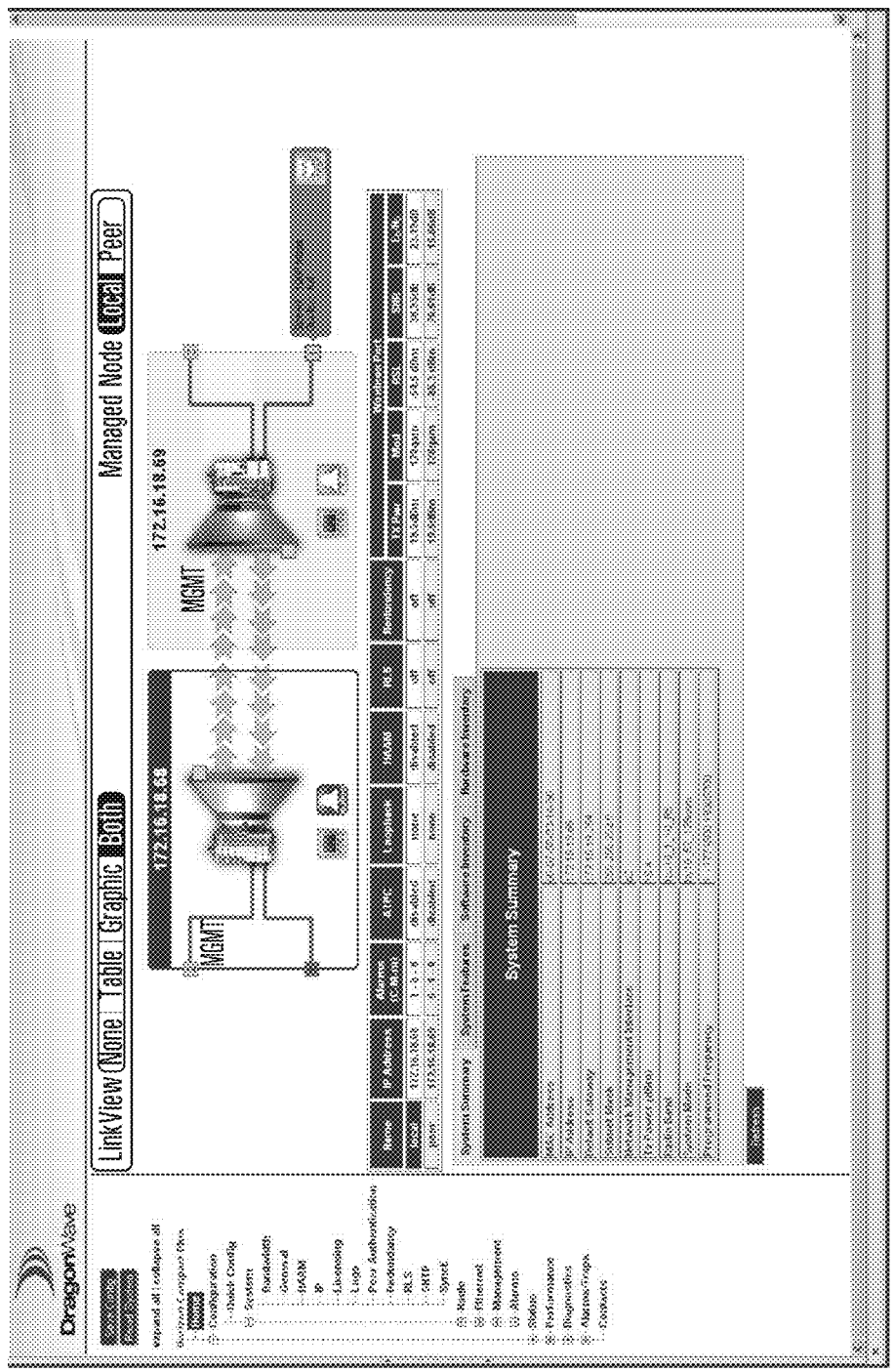

Consider a scenario in which a user changes the radio channel in both communication nodes that are participating in a wireless communication link. For this new channel to take effect, both communication nodes should be reset. The user could be connected to one of the communication nodes through a Ethernet port as shown in FIG. 14B, and hence the other communication node is being accessed over the wireless communication link between the communication nodes. If the user resets the local communication node first, then the wireless communication link and thus the connection to the peer communication node will be lost. When the local communication node restarts it will be working on the new channel, and a wireless link with the peer communication node connection cannot be established without taking further action. This could lead to permanent loss of the wireless connection to peer communication node unless that communication node is otherwise accessible and can be reset.

An additional graphical element such as one or both of the "MGMT" indicators shown in FIG. 14B may avoid issues associated with improper reset of communication nodes in an incorrect order. While it might not appear to be difficult to identify the local communication node through which a wireless link is being managed, it should be noted that in some embodiments there are additional related communication nodes such as partner communication nodes in redundancy configurations, and with more communication nodes it may become more difficult to track which communication node and port is currently serving as the management source.

Figure 15:
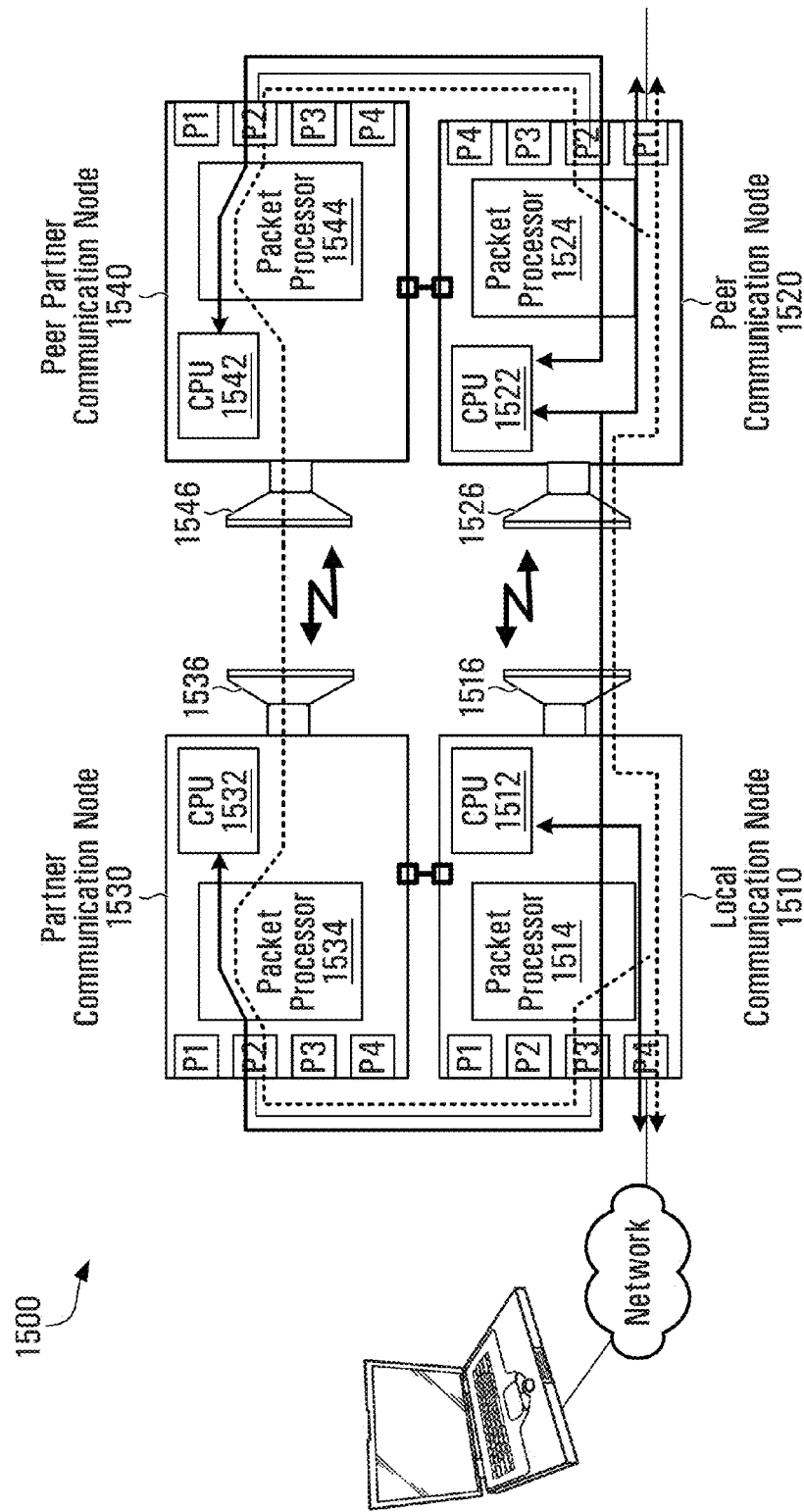
FIG. 15 is a block diagram illustrating an example of an automatic discovery mechanism in a multiple-link system.

In one embodiment, the connected local communication node discovers other communication nodes that form the link with it through a point to point discovery mechanism. FIG. 15 is a block diagram illustrating an example of an automatic discovery mechanism in a multiple-link system

1500. In this example 1500, the local, peer, partner, and peer partner communication nodes 1510, 1520, 1530, 1540 each include four Ethernet ports P1, P2, P3, P4, a CPU 1512, 1522, 1532, 1542, and a wireless interface shown generally at 1516, 1526, 1536, 1546. A packet processor 1544, 1524, 1534, 1544 is also shown in each communication node 1510, 1520, 1530, 1540. Peer communication node discovery by the local communication node 1510, as well as management of the peer communication node 1520, is through the local/peer wireless communication link between the wireless interfaces 1516, 1526. Discovery and management of the local partner communication node 1530 are through an Ethernet connection between local and partner ports P2, and similarly discovery and management of the peer partner communication node 1540 are through the local/peer wireless communication link and the peer/peer partner Ethernet connection. A management system web connection to the local communication node 1510 is through the Ethernet port P1 in this example, and this single connection enables management of all four communication nodes 1510, 1520, 1530, 1540.

The "Data" paths in FIG. 15 represent data flow in an aggregation scenario, where communication traffic is distributed between the two wireless communication links, between the wireless interfaces 1516, 1526 and between the wireless interfaces 1536, 1546, in order to aggregate bandwidth on those links. This could be implemented as disclosed in the above-referenced U.S. patent application Ser. No. 12/457,286, for example. Communication traffic received by the local communication node 1510 for transmission to the peer communication node 1520 in FIG. 15 is processed by the local communication node packet processor 1514 and distributed between the local communication node and the partner communication node 1530 (through the Ethernet port P2), for transmission over the wireless communication links. The communication traffic is then combined by the peer communication node packet processor 1524 in this example, and output to the Ethernet port P1. Transmission of traffic in the opposite direction is handled in a similar manner.

In a redundancy system, only one of the two wireless communication links is Active. Management information (Mgmt) flow may still be as shown in FIG. 15, although Data flow would be through only an Active one of the wireless communication links in some embodiments. The other wireless communication link would be in a Standby state, and communication traffic would be switched to that link in the event of a protection switch. If the wireless communication link between the local and peer communication nodes 1510, 1520 is Active, for example, then the Data flow is between the local and peer communication nodes. Although the same communication traffic could also be transmitted over the Standby wireless communication link, between the peer and peer partner communication nodes 1530, 1540 in this example, that traffic on the Standby link would typically be ignored until there is a protection switch. Additional connections between the local/partner communication nodes 1510, 1530 and peer/peer partner communication nodes 1520, 1540 (shown next to the CPU 1512 at the local communication node 1510 and just above the packet processor 1524 at the peer communication node 1520) are shown in FIG. 15 to represent another path over which the Active/Standby states of the communication nodes and links could be controlled.

Once a communication node that is participating in a communication link is discovered, the "discovering" communication node creates a point to point information exchange conduit with the discovered communication node. With reference again to FIG. 6, in one embodiment this conduit is a connection from a LinkView Client 610, 612 connected to the local communication node 616 to the Management Server 632, 634, 636 of each of the peer/partner/peer partner communication node which is used to either send responses from queries by the Web (LinkView) interface client or push information to the Web interface, through a LinkView Proxy 620, 622. Each discovered communication node pushes status information to its management system through the local communication node to which the management system is connected. Some management information such as status information could be pushed periodically, while other management information such as information discovered over connections between communication nodes and alarms are pushed to the management system whenever an event occurs.

Figure 16:
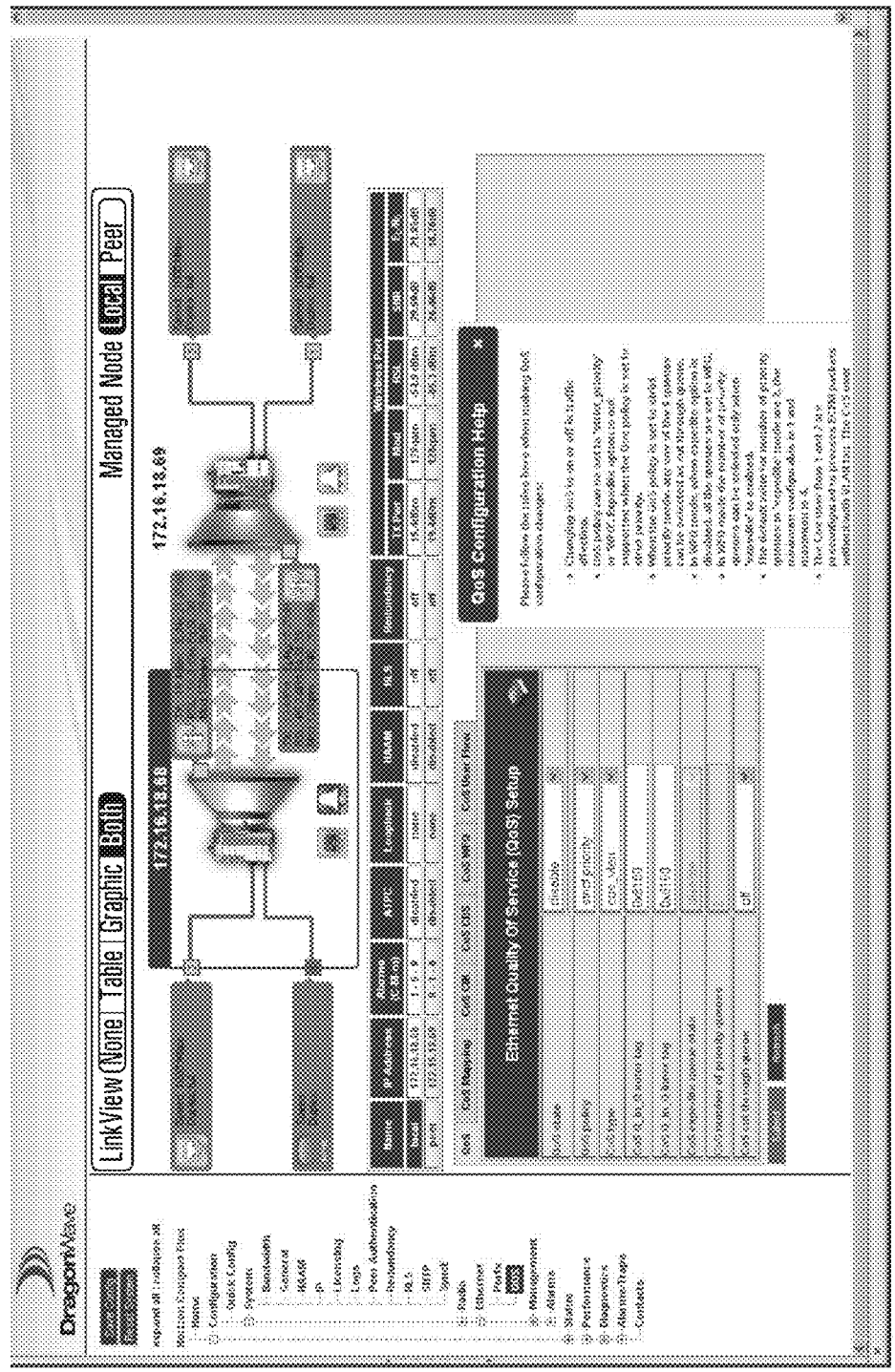
FIGS. 16 to 21 include example GUIs.

In the example GUI of FIG. 16, there are several hot-spots or handles for which details are displayed. These details could be shown, for example, when the user hovers a pointer over each handle, stay open if the user clicks on the handle (for example, an Ethernet port), and close if the user clicks on the hot spot again. Some handles or icons like the alarm icon and port handles change colour in some embodiments, based on the status (link/no link for port, alarm condition and severity, etc.). Icons in the graphical view may also provide links to configuration pages for attribute switching. For example, if the user clicks on the communication node with IP Address 172.16.18.68, and then clicks on the Alarm icon, this will bring up the alarm configuration page of the communication node, and any changes the user makes are applied to that communication node.

FIG. 16 illustrates configuration of Ethernet QoS (Quality of Service), as an example of a configuration page. The "Managed Node" selector indicates the communication node context, which is local in this example. The Ethernet Qos setting corresponds to the Managed Node.

The example GUI in FIG. 16 also shows a help icon in the header of the Ethernet QoS Setup window. Clicking and/or possibly hovering over the help icon could open a context-sensitive help page as shown.

In the left pane of the example GUI in FIG. 16, when the user selects a configuration item which is Ethernet QoS in this case, that item could be highlighted to show the context of the item being configured. The view selection graphical element (Both in this example), the Managed Node selection graphical element (Local in this example), the backgrounds of the managed communication node representation in the graphical view and its name in the row in the tabular view, the configuration window, and the configuration item that is selected on the left pane are all highlighted, indicating the context of the communication node and the item being configured.

Figure 17:
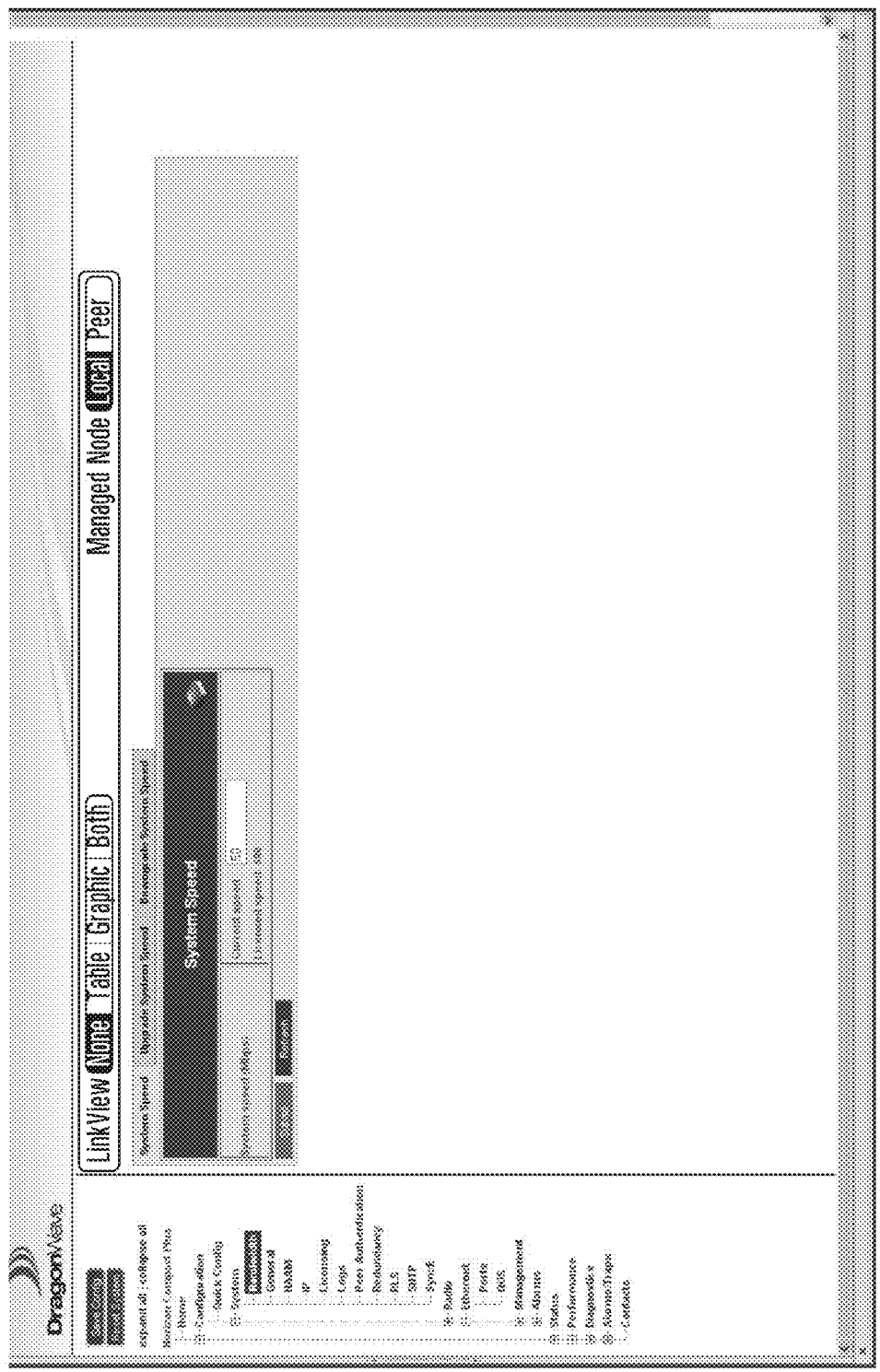
Figure 18:
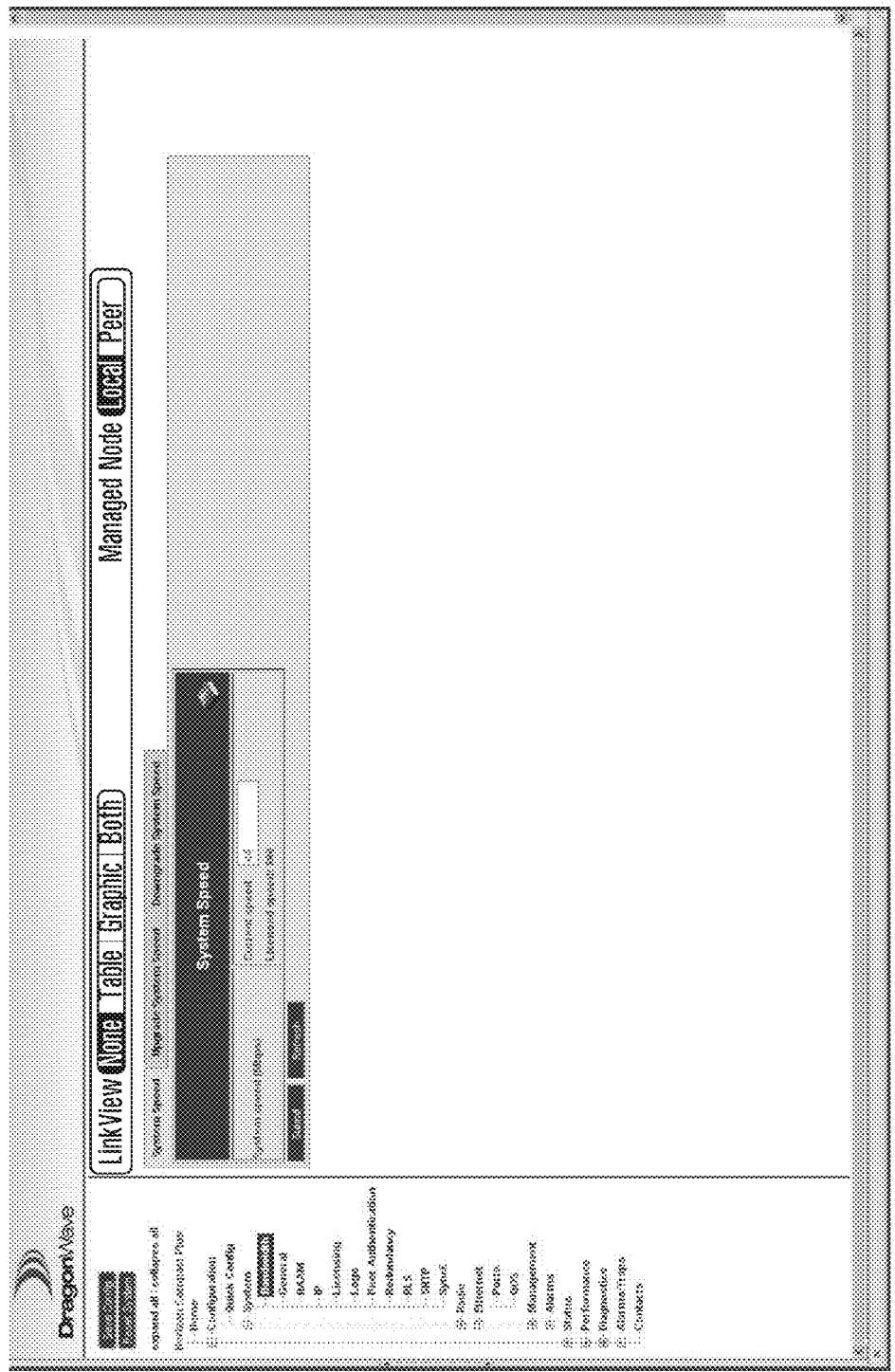
Figure 19:
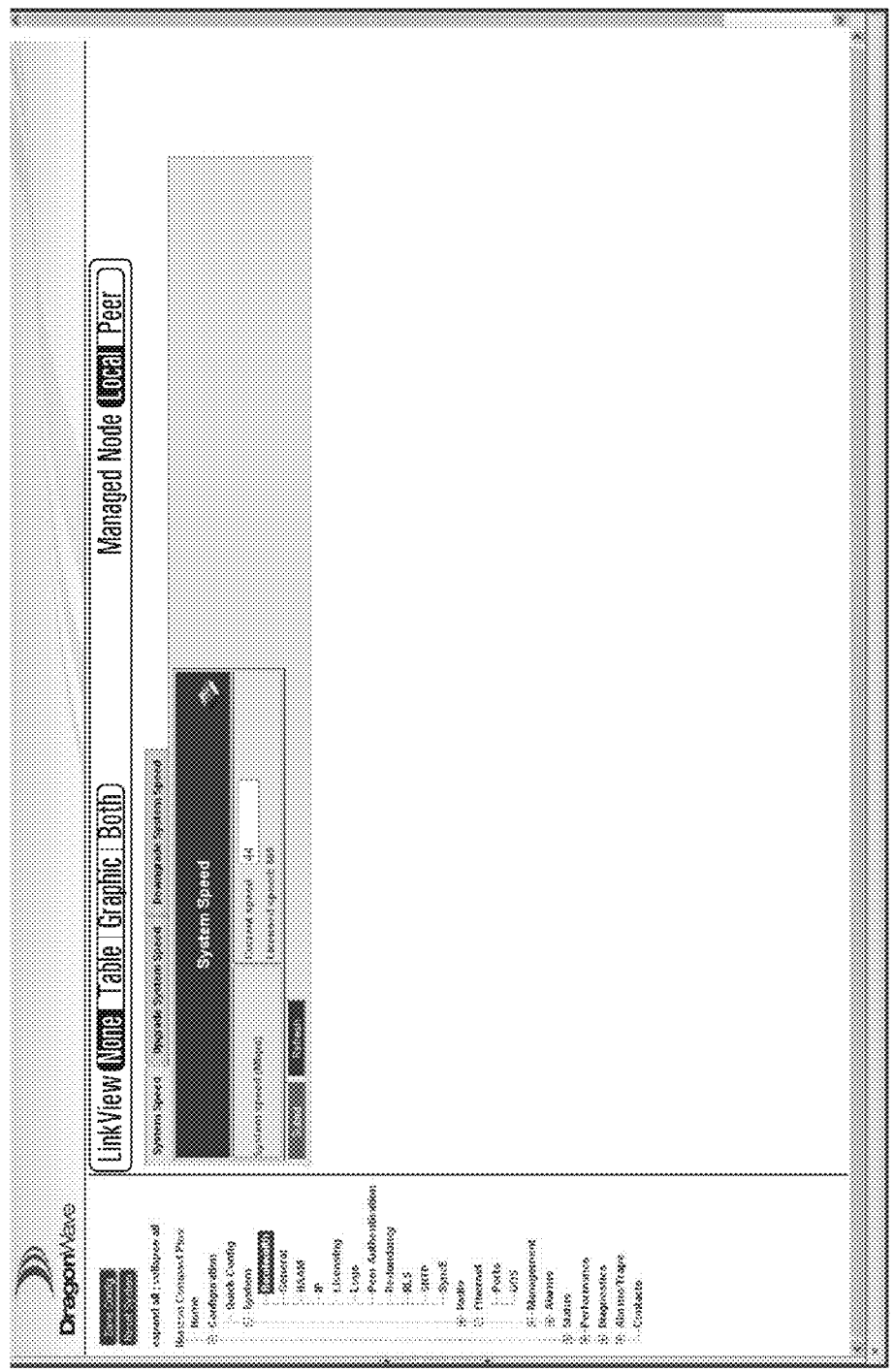

FIGS. 17 to 19 illustrate an additional feature that may be provided. The Submit graphical element, which is provided below each configuration window in some embodiments, might not be available for user selection unless a configuration item is changed, and could be displayed in in a first color, such as grey. When the configuration item is changed, the Submit graphical element could be turned to a second color, such as red, and the text colour of the value typed into the configuration window could be displayed in a third color, such as blue, indicating to the user that the value has been changed but has not yet been submitted to change actual configuration in the system. In the example GUI of FIG. 17 and using the example colors noted above, the value of current speed could be displayed in black, and the submit button could be displayed in grey. In the example GUI of FIG. 18, the text "44" could be displayed in blue since the user has changed the value, and the Submit button could be displayed in red, which indicates to the user that the value has been changed but not submitted. The view in FIG. 19 is displayed after the Submit button has been selected. The new value, which has been submitted, could now be displayed in black, and the Submit button again is not available for selection.

It is possible that multiple users could be making configuration changes to the same communication node at the same time, through different LinkView clients, or even through different interfaces. Suppose, for example, that after a user enters "44" as shown in FIG. 18 but before the change to "44" has been submitted, another user changes the system speed to a different value, such as "45", and submits that change. This change in speed configuration before an in-progress change is submitted could be flagged to the user of the example GUI in FIG. 18 by dynamically updating the GUI to show the new value "45", in a different color such as red for instance. This alerts the user to the fact that the speed configuration has been changed. Dynamic updating could use a push connection or other technology, such as WebSockets, to track configuration changes and keep configuration information current.

Figure 20:
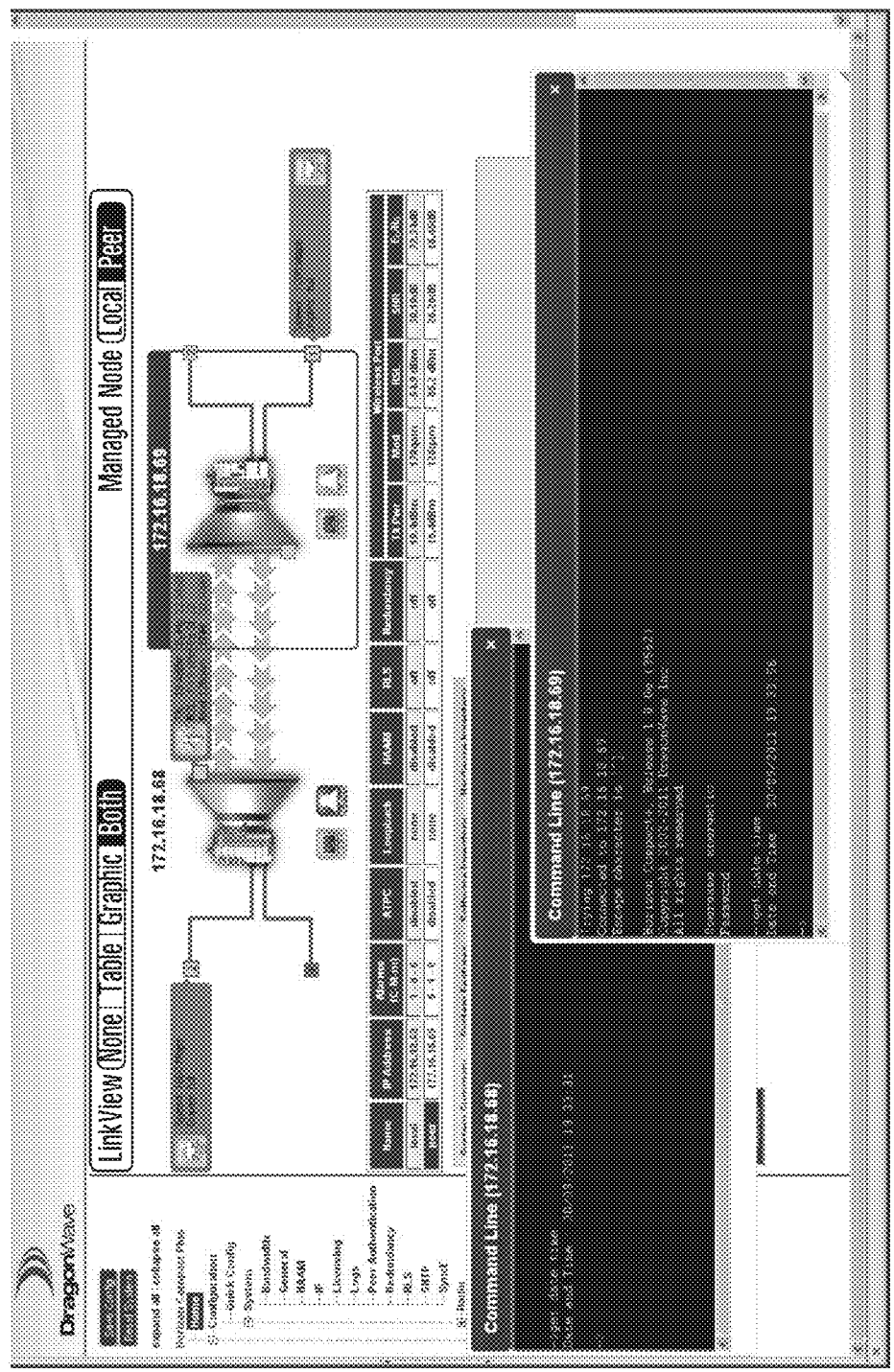

FIG. 20 illustrates a GUI in which CLI windows have been opened for each of the local and peer communication nodes, by clicking the WebCLI icons in the graphical representations of the nodes, for example.

Figure 21:
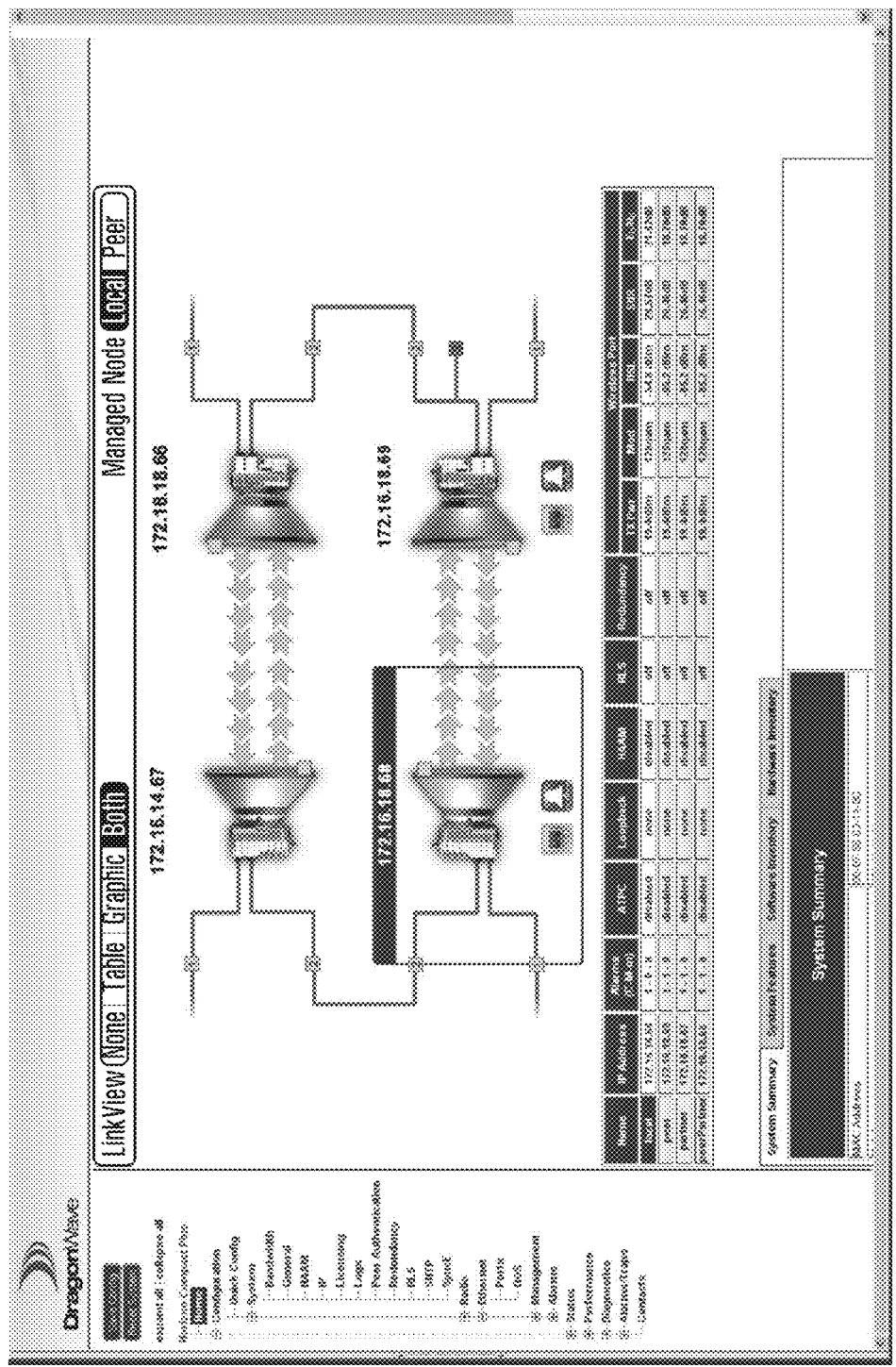

The example GUIs described above relate to a single managed communication link. FIG. 21 illustrates an example GUI in the case of multiple communication links, involving local, peer, partner, and peer partner communication nodes. In the "Both" view shown in FIG. 21, the graphical view includes representations of all four communication nodes, and the tabular view provides additional information for those nodes. Features disclosed herein in the context of a single communication link may be applied in multiple-link implementations as well.

Many aspects of communication link management have been described in general terms above. Further example implementation details are provided below, with reference to FIG. 22. Components shown in FIG. 22 at a management system 2210 could be provided in a communication link management module (206 FIG. 2), and components shown at each communication node 2230, 2240, 2250, 2260 could be provided in a node management module 306 (FIG. 3) at each node.

Figure 22:
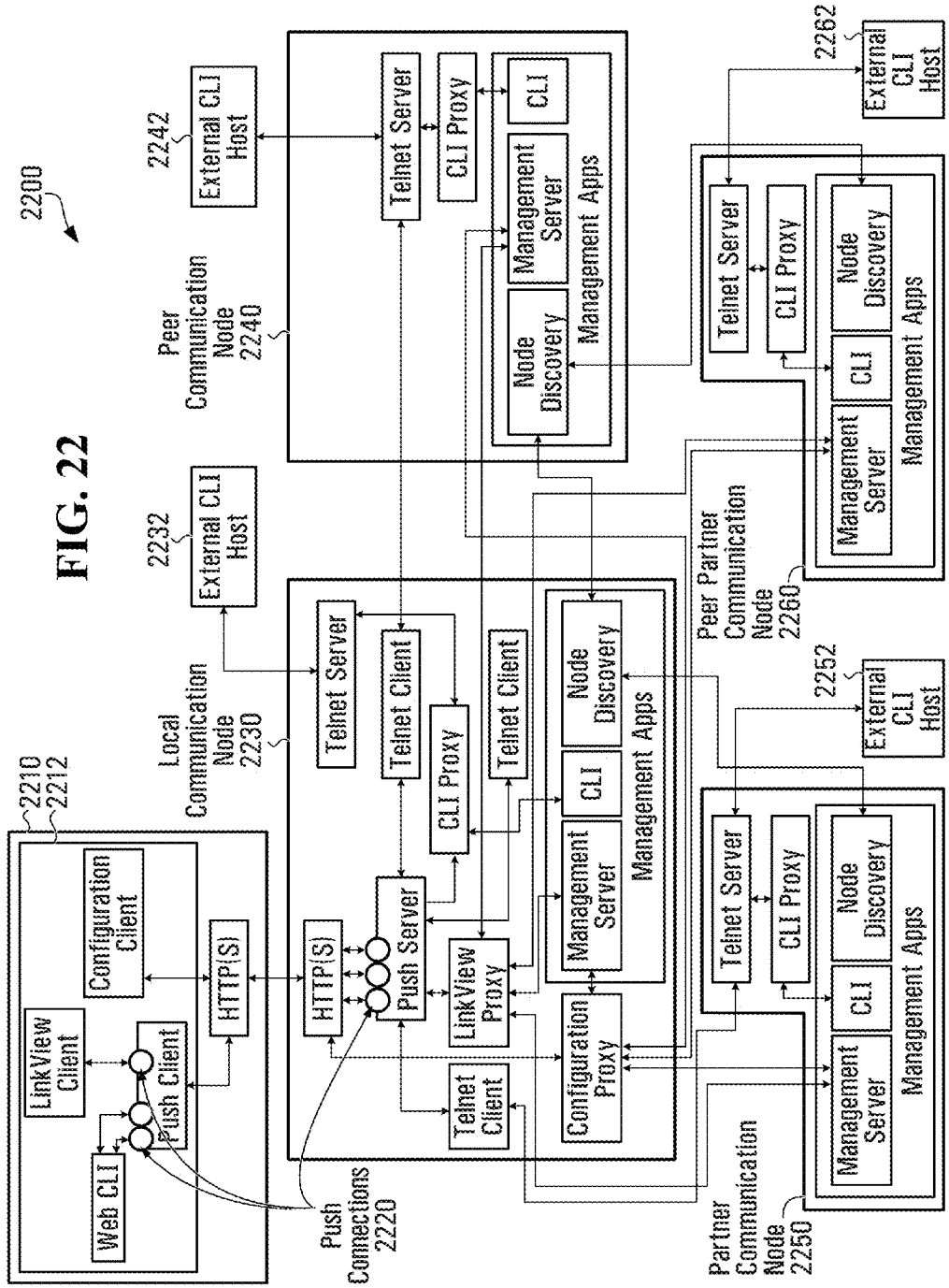
FIGS. 22 to 25 is a block diagram illustrating example implementation details.

In the example 4-node related communication link system 2200 as shown in FIG. 22, there are local, peer, partner, and peer partner communication nodes 2230, 2240, 2250, 2260. Only the local and peer communication nodes 2230, 2240 exist in the case of a single communication link. In order to avoid congestion in the drawing, only the local communication node 2230 is shown with a full set of modules involved in an embodiment of communication link management. The other communication nodes 2240, 2250, 2260 are shown only with modules that cooperate with the local communication node modules where a Web session is established with the local communication node 2230. All communication nodes 2230, 2240, 2250, 2260 may include the full set of modules as shown for the local communication node 2230, to enable communication link management through a connection to any single communication node.

The communication nodes 2230, 2240, 2250, 2260 can discover immediately connected devices (through wireless or Ethernet connections as described above) that form a communication link or related communication link, using a point to point discovery protocol in some embodiments. A point to point protocol ensures that only the communication nodes that are connected to each other to form a communication link are discoverable and then become known to each other. Node discovery is illustrated between "Management Apps" modules of the local communication node 2230 and the partner and peer communication nodes 2240, 2250, 2260. A Node Discovery process would also take place between the peer communication node 2240 and the peer partner communication node 2260.

The perspective of the local/peer/partner/peer partner is purely based on the external management connection. For example, in FIG. 14A, if the user creates a web session to 172.16.18.69, then this communication node becomes local, and 172.16.18.68 becomes the peer. If user creates session to 172.16.18.68 as shown, then the 0.68 communication node is local and the 0.69 communication node is the peer.

There are three different view contexts, including regular configuration pages to configure attributes of the system and to view running configuration/status of the system, LinkView graphical views and tables, and the WebCLI used for running CLI to different nodes from the Web connection. When the user opens a Web session to the local communication node 2230, the Web client (an Internet browser in this example) running on the host management system communicates with the Web server in the local communication node. The Push Client and the Push Server shown in FIG. 22 interact with the LinkView Client and the LinkView Proxy described above. The LinkView Proxy acts as a multiplexer of the single Web connection from the Web client to different communication nodes. The LinkView Client includes a demultiplexer, and the HTTP(S) connection carries multiplexed messages between the LinkView Proxy and the LinkView Client.

There is a "Management Server" on each communication node 2230, 2240, 2250, 2260, which serves management data to the "LinkView Proxy" and to the "Configuration Proxy" on the local communication node.

At every communication node where there is an active Web session, there is one LinkView Proxy per web session, to handle the management information served by 4 Management Servers (one in each communication node 2230, 2240, 2250, 2260). Each LinkView Proxy collects management data from different Management Servers and delivers it to a LinkView Client through a Push Server.

The "Configuration Proxy" at the local communication node 2230 receives Web requests from the Configuration Client for attribute configuration and running status. Based on the communication node in context (local/peer, etc.) it sends the requests to the Management Server in the corresponding communication node, gets the response back, and sends it to the Configuration Client. For instance, in the example GUIs described herein, web pages from the left hand side tree could include status pages, Ethernet and wireless statistics, alarms and trap history that are updated on this type of request/response basis through the Configuration Client, HTTP(S), Configuration Proxy, and Management Server. LinkView Client pushed updates might include some, but not necessarily all, of the information for these web pages.

When a WebCLI request is received for the local communication node 2230, the Push Server connects to the CLI module in the Management Apps of the local communication node, through its CLI Proxy, and serves those requests. If the CLI request is for the peer communication node 2240 or another communication node, then the Push Server connects to the Telnet server on the other communication node through a local Telnet client. In one possible implementation a standard Telnet client and Telnet server are used. However, this CLI request service could be implemented through another IPC (inter process communication) mechanism involving client-server architecture. Alternatively the local Push sever could talk to the CLI proxy on the other communication node directly through some form of data connection such as a secured socket. The CLI Proxy behaves as an intermediary between the Push Connection in the Push Server (several of which are shown at 2220) or Telnet server, and the CLI module in the Management Apps. It also behaves as an intermediary between the External CLI host 2232 and the CLI module in the Management Apps. From the CLI Proxy perspective, if connected to an External CLI host, any data coming from the External CLI host 2232 is forwarded to the CLI module, and any data from the CLI module is forwarded to the External CLI host 2232. For each CLI connection, there is one CLI Proxy instance running. From FIG. 22, it will be apparent that embodiments of the invention do not necessarily preclude communication node management through conventional CLI hosts. An external CLI host 2242, 2252, 2262 is also shown for the peer, partner, and peer partner communication nodes 2240, 2250, 2260.

On the host (management system 2210) side, the Push Client receives management information from the local communication node 2230 and redirects it to one of several WebCLIs in the example shown, or to the LinkView Client which updates the various communication link views.

Typical HTTP requests are connectionless in that they terminate once a request has been responded to by the HTTP server. In order to maintain communication, the client must repeatedly request information from the server (Polling mechanism). The Push Server avoids this constant polling and use of unnecessary bandwidth by providing a connection-oriented 2-way communication channel between a particular browser instance on one end and a stand-alone client on the other. This is accomplished with one permanent open HTTP connection where data is received by the browser client asynchronously (i.e., a push connection 2220). When the Web client (Internet browser) wishes to communicate with the Web server, new http requests are sent to the server, with the responses returning asynchronously on the open permanent push connection. This works well for applications such as WebCLI, or the LinkView Client at the host management system 2210 in which asynchronous response data is required over long periods of time, where the amount of response data is non-deterministic.

The Push Server connection never closes and allows client data to be received by the Push Client on the browser asynchronously. In one particular embodiment, the Multiplexer Class in the browser will create a Push Client object (also sometimes referred to as a dataStream object) which will cause a new Push connection to be opened to the Push Server on the target communication node. Once this connection is opened, the Multiplexer will asynchronously receive any data on that connection until the point where some termination event occurs (for example, the user closes the browser/tab, or the target communication node is reset). The Push Client does not look at or search through any client data, it is merely stripped of header information and passed straight up to the client. When the Multiplexer (or some other user of the Push Client) decides to transmit data to the Push Server, it simply performs a sendData( ) call with its data, and the Push Client object will send the data in an independent request without expecting a response, and independent of the open push connection. The response to the data, if there is any, will be received asynchronously on the open push connection (i.e. received by the push connection on the Push Server, and transmitted from the push connection to the client on the browser).

Internally, the Push Client could maintain an open connection to the Push Server via one of several underlying common communication mechanisms, such as WebSockets, "Long-Poll via Ajax", and "Polling at regular intervals". In the case where some termination event occurs, the Push Client informs its client of the termination and the client must decide how to proceed. In some embodiments, the LinkView client will attempt to reconnect after a certain interval, and the Web CLI will simply wait for the user to hit a key and re-connect to the CLI module on the target communication node. Keep-Alive messages are sent periodically from the dataStream object to the Push Server to determine connection status. Other than the Keep-Alive messages, there are no other dataStream-initiated messages sent to the Push Server (i.e., most communication is pushed from the Push Server to the browser instance).

For the LinkView Client in one embodiment, one push connection is used (one dataStream object is created), and updates with regards to the link are received asynchronously from the view client once a connection has been established.

The WebCLI module at the host management system 2210 supports event handling as the user types inputs on a keyboard, and terminal handling as data comes in from the CLI module on the target communication node, including basic handling of common ASCII escape sequences, for instance. Once the WebCLI window has been opened, the user must type a key to start the CLI session in some embodiments, and the CLI prompt is presented. The user is not required to log into the CLI as the existing web session is used to authenticate the user in some embodiments. The Web CLI interaction could be identical to a typical CLI session via a telnet client or an SSH client, except that when the user closes the WebCLI window, it will maintain its state, i.e, the CLI session is not closed, and when the window is re-opened, the user may continue from where they left off within the CLI window. Internally, all screen updates are pushed from the target node CLI entity via the push connection.

When the user types a character to start the WebCLI session, the Push Client requests a new push connection from the Push Server. The Push Server will respond with a unique session id (constituting part of the push connection). This internal push session id uniquely identifies the push connection and allows the Push Server to distinguish between connections. A new worker thread is allocated for this push session, and this thread will wait for any updates coming from the client (such as the LinkView Proxy, or in this case, the CLI Proxy), and will forward them to the Push Client on the browser. A typed character from a WebCLI session is sent to the Push Server, which sends this to the connected CLIProxy. The CLIProxy forwards this to the CLI Module in the Management Apps which then responds by echoing the character. The character is received by the waiting thread in the Push Server, which then forwards this to the Push Client on the browser. The Push Client on the browser tells its WebCLI client about the new data, and the WebCLI client then updates the screen with the new data.

A WebCLI module may implement a "Front-line" parser to provide command history and/or command completion, prior to sending the full command string to the target communication node.

Considering configuration changes and status queries in more detail, when a communication node starts up, as part of startup code, the "HTTP(S)" module, which represents the standard HTTP or HTTPS protocol stack, starts up and it in turn instantiates the 'Configuration Proxy' process as well. The 'Configuration Proxy' process handles get and set requests coming from the 'HTTP(S)' module and sends responses back to the HTTP(S) module.

In order to support configurations on multiple communication nodes from within the same browser, the "Configuration Proxy" differentiates where requests are to be sent. The "Configuration Proxy" running on the local communication node 2230 relays received requests to the "Management Server" running on either the local, peer, partner, or peer partner communication node 2230, 2240, 2250, 2260. The requests, in Javascript code in some embodiments, flag the get/set requests for a specific node.

As an example, consider opening the Ethernet configuration page. The "Configuration Proxy" request might look like the following for the local communication node 2230:
    http://172.16.18.68/Ethernet/local/
        queryConfig.fcgi?pagename=enetConfig.
The same request but for the peer communication node 2240 might look like:
    http://172.16.18.68/Ethernet/peer/
        queryConfig.fcgi?pagename=enetConfig.

In these examples, the requests include unique "local" and "peer" keys. Additional unique keys could be included in requests for the partner and peer partner communication nodes 2250, 2260. The last keyword "enetConfig" in the example requests indicates which web page is requested for a get request.

When a form is posted on the Web (when configuration has changed and the user submits the changes), the request might look like:
    http://172.16.18.68/Ethernet/local/postConfig.fcgi
    http://172.16.18.68/Ethernet/peer/postConfig.fcgi
    http://172.16.18.68/Ethernet/partner/postConfig.fcgi
    http://172.16.18.68/Ethernet/peerpartner/postConfig.fcgi.

When the "Configuration Proxy" receives the requests from the "HTTP(S)" module, it parses the unique key and makes a call to the "Node Discovery" module of the local communication node 2230 to identify the corresponding IP address for the communication node to which the request applies. It then opens the socket to that specific communication node (if it is not the local communication node 2230), and then sends the request to the Management Server at that communication node.

The Management Server running either on the local, peer, partner, or peer partner communication node 2230, 2240, 2250, 2260, parses the request and responds back to the Configuration Proxy.

If the request is a GET, in the above examples a query of "enetConfig" page, the Management Server gathers the data by calling to the APIs within Management Apps that handles GET requests and forms an XML (eXtensible Markup Language) response to the Configuration Proxy. The Configuration Proxy then forwards the XML response to the HTTP(S) module. An example of the XML format is as follows:
<enetConfig><dwiPortConfigState_1>2</dwiPortConfigState_1><dwiPortConfigState_2>2</dwiPortConfigState_2><dwiPortConfigState_3>1</dwiPortConfigState_3><dwiPortConfigState_4>1</dwiPortConfigState_4><dwiPortConfigName_1/><dwiPortConfigName_2/><dwiPortConfigName_3/><dwiPortConfigName_4/><dwiPortConfigAutoNeg_1>1</dwiPortConfigAutoNeg_1><dwiPortConfigAutoNeg_2>1</dwiPortConfigAutoNeg_2><dwiPortConfigAutoNeg_3>1</dwiPortConfigAutoNeg_3><dwiPortConfigAutoNeg_4>1</dwiPortConfigAutoNeg_4><dwiPortConfigSpeed_1>4</dwiPortConfigSpeed_1><dwiPortConfigSpeed_2>4</dwiPortConfigSpeed_2><dwiPortConfigSpeed_3>4</dwiPortConfigSpeed_3><dwiPortConfigSpeed_4>4</dwiPortConfigSpeed_4><dwiPortConfigDuplex_1>1</dwiPortConfigDuplex_1><dwiPortConfigDuplex_2>1</dwiPortConfigDuplex_2><dwiPortConfigDuplex_3>1</dwiPortConfigDuplex_3><dwiPortConfigDuplex_4>1</dwiPortConfigDuplex_4><dwiPortConfigMedia_1>3</dwiPortConfigMedia_1><dwiPortConfigMedia_2>1</dwiPortConfigMedia_2><dwiPortConfigMedia_3>1</dwiPortConfigMedia_3><dwiPortConfigMedia_4>1</dwiPortConfigMedia_4><dwiPortConfigPauseFrame_1>1</dwiPortConfigPauseFrame_1><dwiPortConfigPauseFrame_2>1</dwiPortConfigPauseFrame_2><dwiPortConfigPauseFrame_3>1</dwiPortConfigPauseFrame_3><dwiPortConfigPauseFrame_4>2</dwiPortConfigPauseFrame_4><dwiPortConfigMaxFrameSize_1>1600</dwiPortConfigMaxFrameSize_1><dwiPortConfigMaxFrameSize_2>1600</dwiPortConfigMaxFrameSize_2><dwiPortConfigMaxFrameSize_3>1600</dwiPortConfigMaxFrameSize_3><dwiPortConfigMaxFrameSize_4>1600</dwiPortConfigMaxFrameSize_4><dwiPortConfigAdminState_1>1</dwiPortConfigAdminState_1><dwiPortConfigAdminState_2>1</dwiPortConfigAdminState_2><dwiPortConfigAdminState_3>1</dwiPortConfigAdminState_3><dwiPortConfigAdminState_4>1</dwiPortConfigAdminState_4><dwiPortConfigOpticalTx_1>2</dwiPortConfigOpticalTx_1><dwiPortDpState_1>2</dwiPortDpState_1><dwiPortDpState_2>1</dwiPortDpState_2><dwiPortDpState_3>1</dwiPortDpState_3><dwiPortDpState_4>1</dwiPortDpState_4></enetConfig>

When the browser at the host management system receives the XML response, it will set each DOM (Document Object Model) element with the corresponding XML element.

If the request is a POST request, the Configuration Proxy uses the same approach to identify the target communication node, converts the posted string to a JSON format string and forwards it to the Management Server. The Management Server then parses each POST request and applies it individually to the system in the received order. The javascripts running on the browser makes sure the correct order has been applied to the POST after the user submits the changes.

If any of the set requests fail, the reason for failure is attached to the response; otherwise a success is sent back to the HTTP(S) module.

Figure 23:
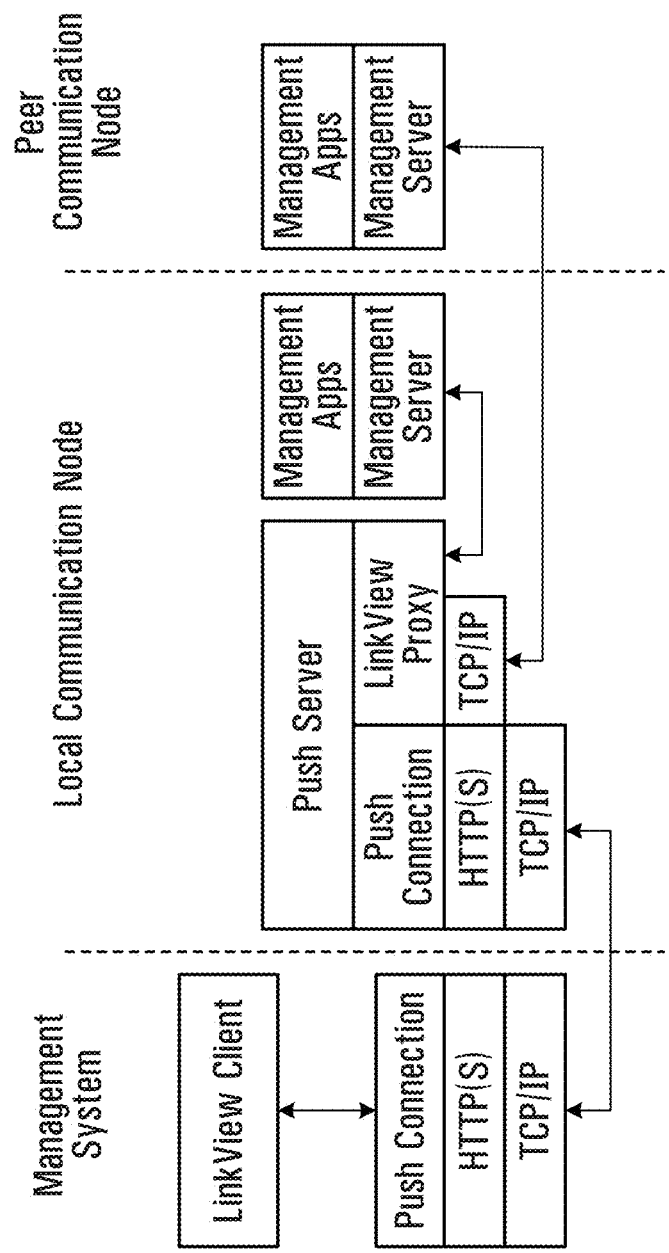
Figure 24:
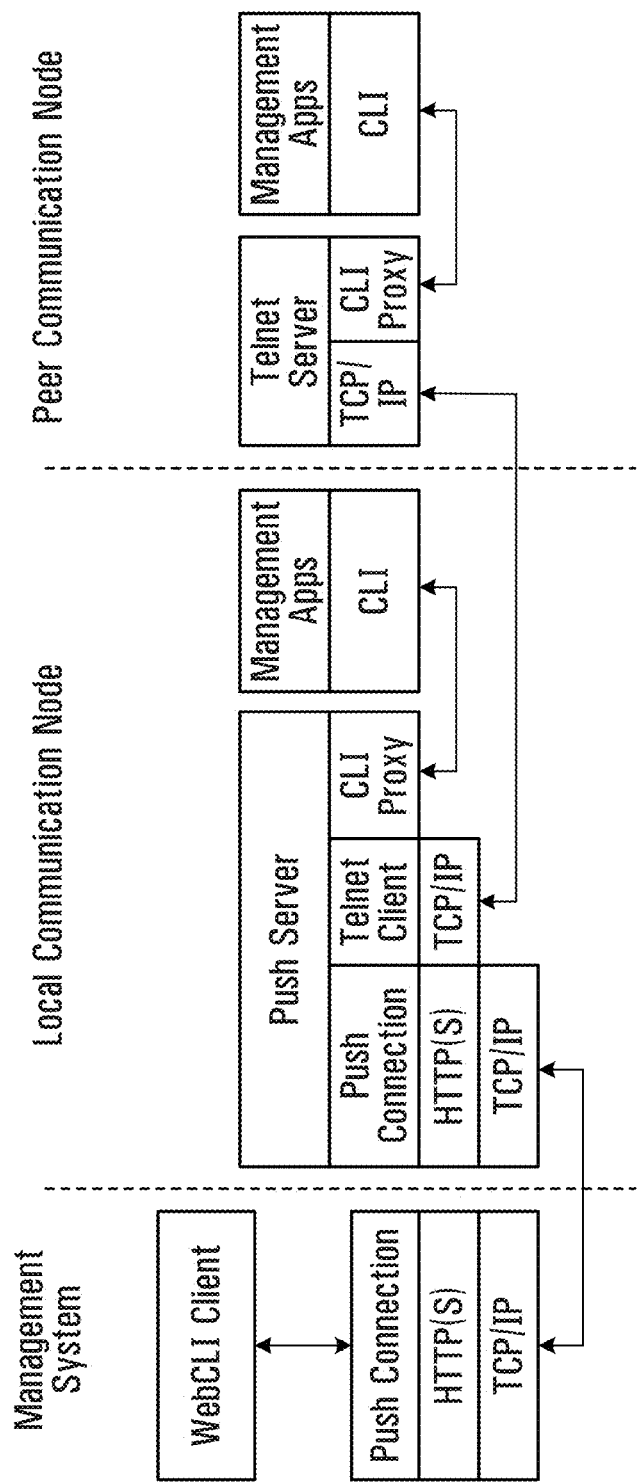
Figure 25:
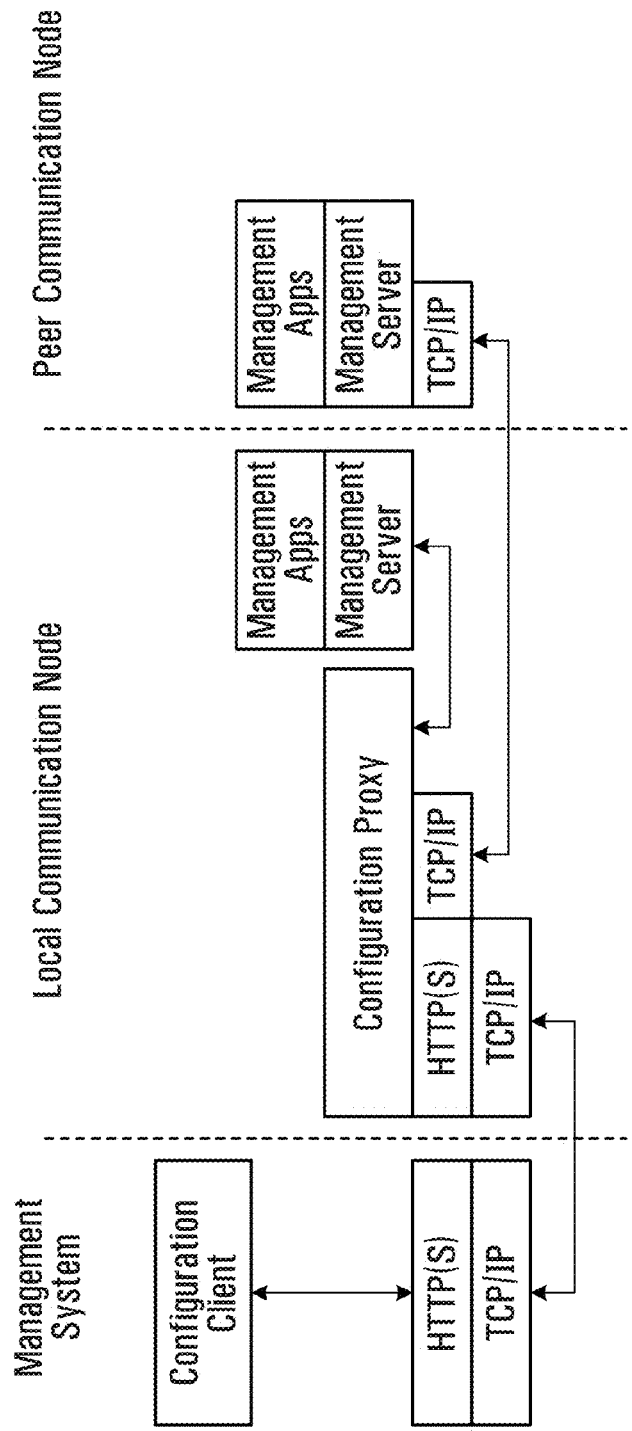

FIGS. 23 to 25 show protocol stack-type representations of data flows. FIG. 23 shows data flow from a LinkView Client and a LinkView Proxy, and further to Management Apps at multiple communication nodes through respective Management Servers at those nodes. This drawing also shows the relationship between the Push Connection and the LinkView Client and Proxy in one embodiment. The Push Connection provides an API to the Push Server, which allows a push-style communication layer. Based on the URL of an HTTP/HTTPS request, the correct upper layer is started at the local communication node, specifically the LinkView Proxy in the case of a link view URL as shown in FIG. 23. FIG. 24 shows a similar infrastructure usage for WebCLI, for data flow between a WebCLI Client and the Management Apps at the local communication node through a Push Server and a CLI Proxy, and at the peer communication node in this example through a Telnet Client/Server and CLI Proxy.

In FIG. 25, data flow between a Configuration Client (i.e., a configuration page as described herein) and Management Apps at local and peer communication nodes is through a Configuration Proxy and a Management Server at each communication node.

Figure 26:
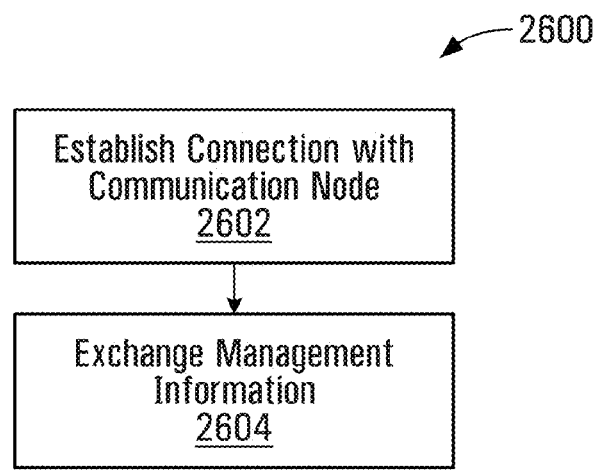
FIGS. 26 and 27 are flow diagrams of example methods.
Figure 27:
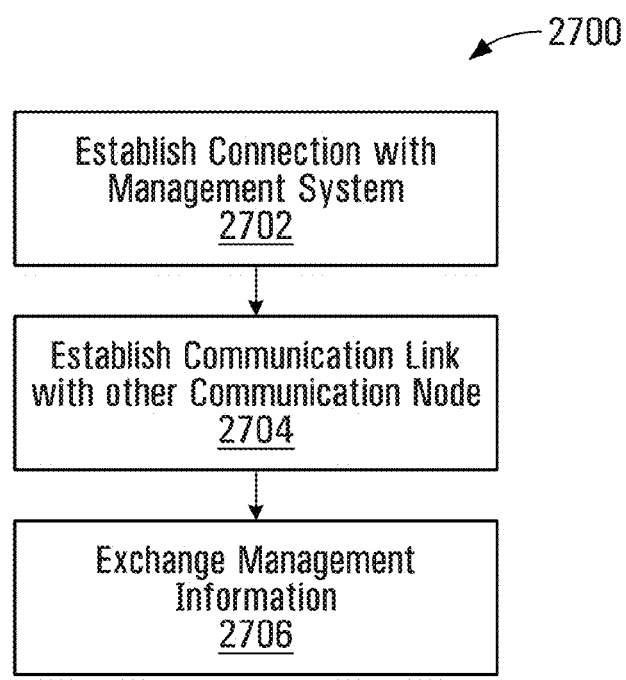

The foregoing description relates primarily to apparatus or system embodiments. Other embodiments, illustratively methods, are also contemplated. FIGS. 26 and 27 are flow diagrams of example methods.

The example method 2600 in FIG. 26 is a management system-side method, which involves establishing a connection with a communication node that participates in a communication link with another communication node, at 2602, and exchanging management information with the communication node over the connection at 2604. The management information includes not only management information associated with the communication node, but also management information associated with the other communication node.

The example method 2700 in FIG. 27 is a communication node-side method, which involves establishing a connection with a management system at 2702 for exchanging management information with the management system, establishing a communication link to enable communications between the communication node an another communication node at 2704, and exchanging management information at 2706. The exchange of management information at 2706 involves both exchanging management information associated with the other communication node over the communication link; and exchanging, with the management system over the connection, management information including management information associated with the communication node and the management information associated with the other communication node.

The example methods 2600, 2700 are intended solely for illustrative purposes, and other embodiments may involve variations of this method. In FIG. 27, for example, the communication link between the communication node and the other communication node need not necessarily be established at 2704 after the connection with the management system is established at 2702. Any or all of the functions disclosed herein in the context of a system or an apparatus may be embodied in a method. Other variations may be or become apparent to those skilled in the art.

Generally, each node in a communication link is traditionally managed individually through its own IP address. A wireless communication link, for example, involves at least two communication nodes and the configurations of these nodes depend on each other for proper operation. Aspects of the present disclosure provide for management of multiple nodes together.

Different UIs such as Web, CLI, and SNMP could be used to manage communication nodes, and each of them has its own advantages. Each of these UIs uses its own protocol to run and is IP connectivity-based, meaning that separate applications and sometimes instances of an application have to run on a host to manage the communication nodes through different types of UIs. User preferences for UIs differ as well. A single application which runs on a host and embodies more than one UI (i.e., provides a graphical view of a communication link, status update and configuration update, and CLI to all communication nodes) as disclosed herein may enhance the user experience.

A Web-based link view is also unique in that the host connects to only one communication node and still enables management of all communication nodes in the communication link. Although HTTP does not provide any capability to multiplex a single connection to multiple IP Addresses, aspects of the present disclosure enable multiplexing of an HTTP connection to multiple communication nodes even though the HTTP connection is established to only one communication node.

What has been described is merely illustrative of the application of principles of embodiments of the invention. Other arrangements and methods can be implemented by those skilled in the art without departing from the scope of the present invention.

For example, the present disclosure is not in any way limited to the divisions of function as shown in the drawings.

The foregoing examples are primarily in the context of a single communication link. In the case of redundant links or link aggregation, for example, where four communication nodes are involved, implementations may be similar, but would involve more nodes. In some embodiments, there could be more than two communication links, involving more than four communication nodes.

The present disclosure is also not in any way limited to the specific example GUIs shown in the drawings. Other embodiments are also contemplated. Additional example GUIs are shown in FIGS. 28 to 34.

Figure 28:
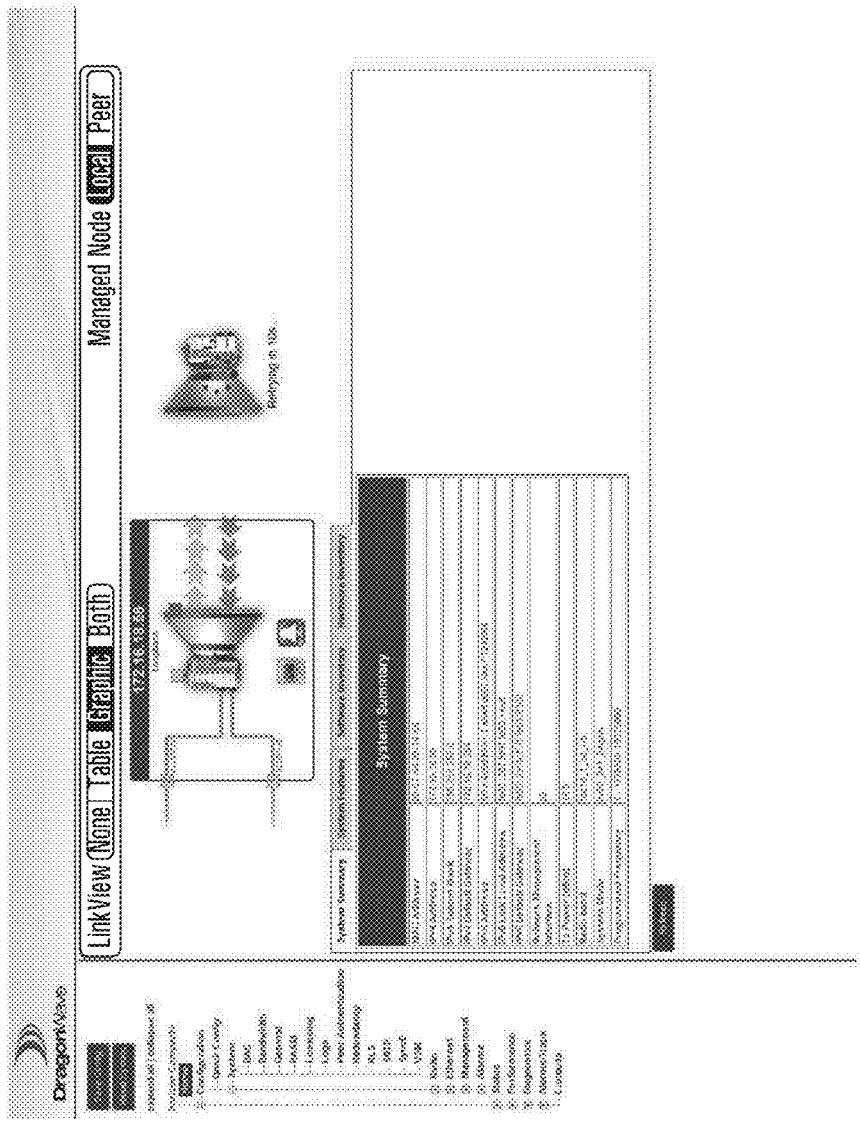
FIGS. 28 to 35 include example GUIs.

FIG. 28 is an example GUI similar to FIG. 11, but showing a Graphic view in which the System Summary includes additional information fields for IPv6. As in FIG. 11, the example GUI in FIG. 28 includes Address, Subnet Mask, and Default Gateway information. In FIG. 28, however, this information is specified for IPv4, and additional IPv6 Address, Link Local Address, and Default Gateway fields are also provided.

Figure 29:
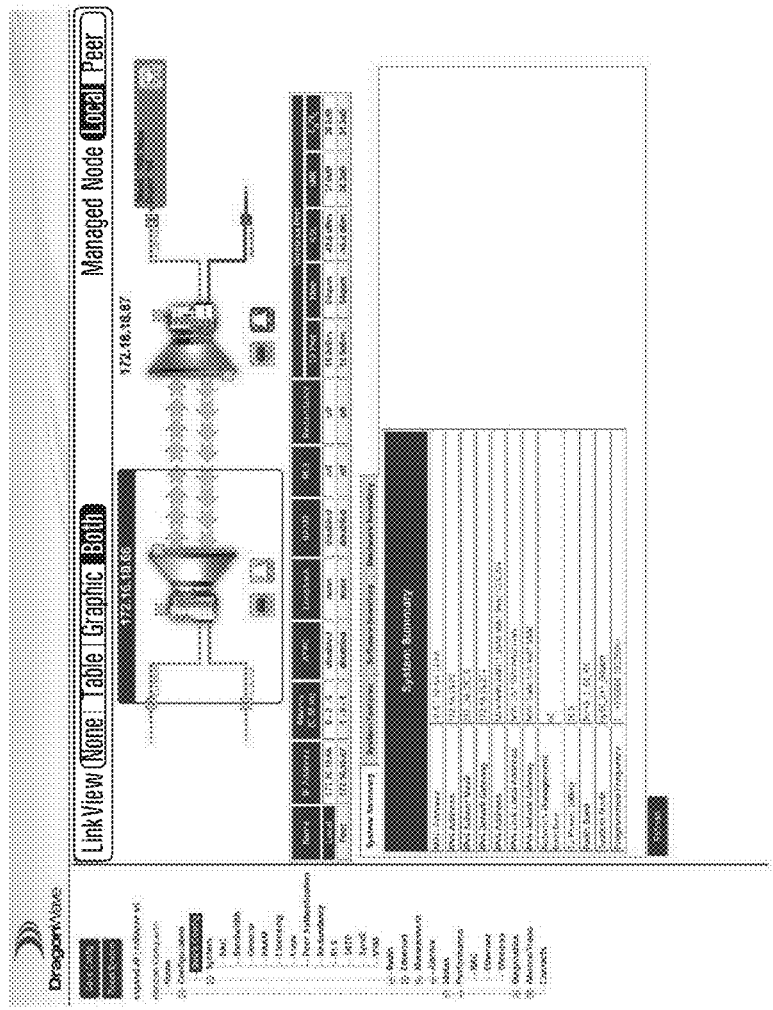
Figure 30:
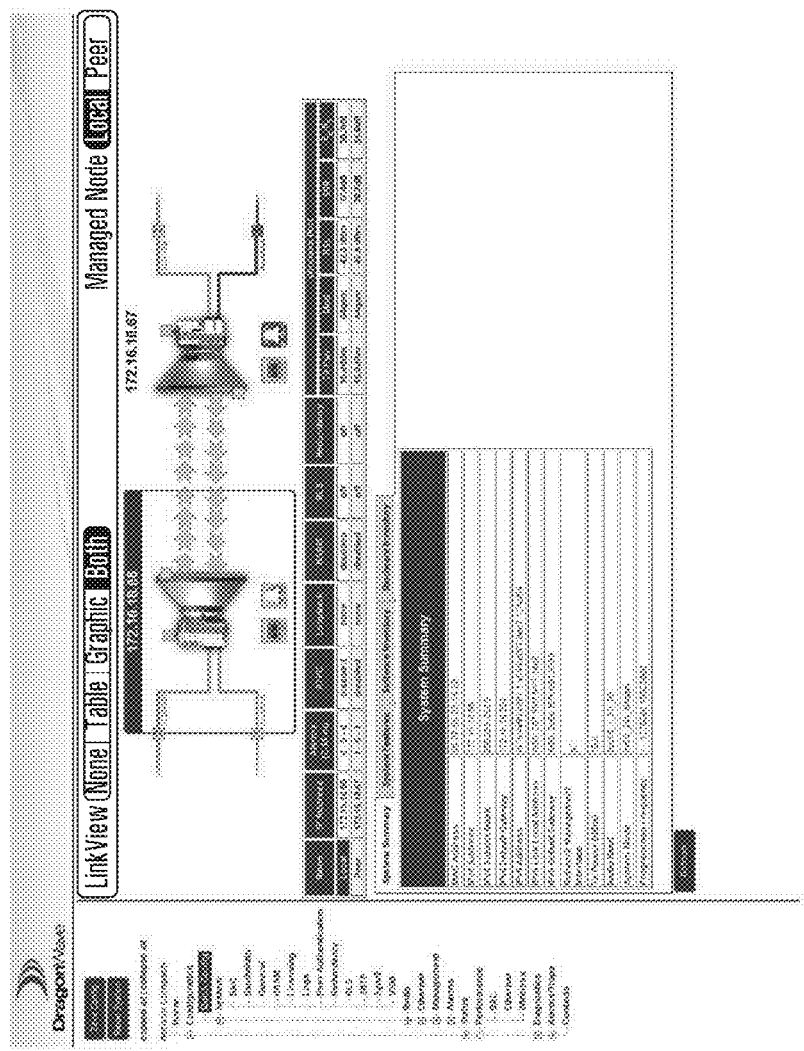
Figure 31:
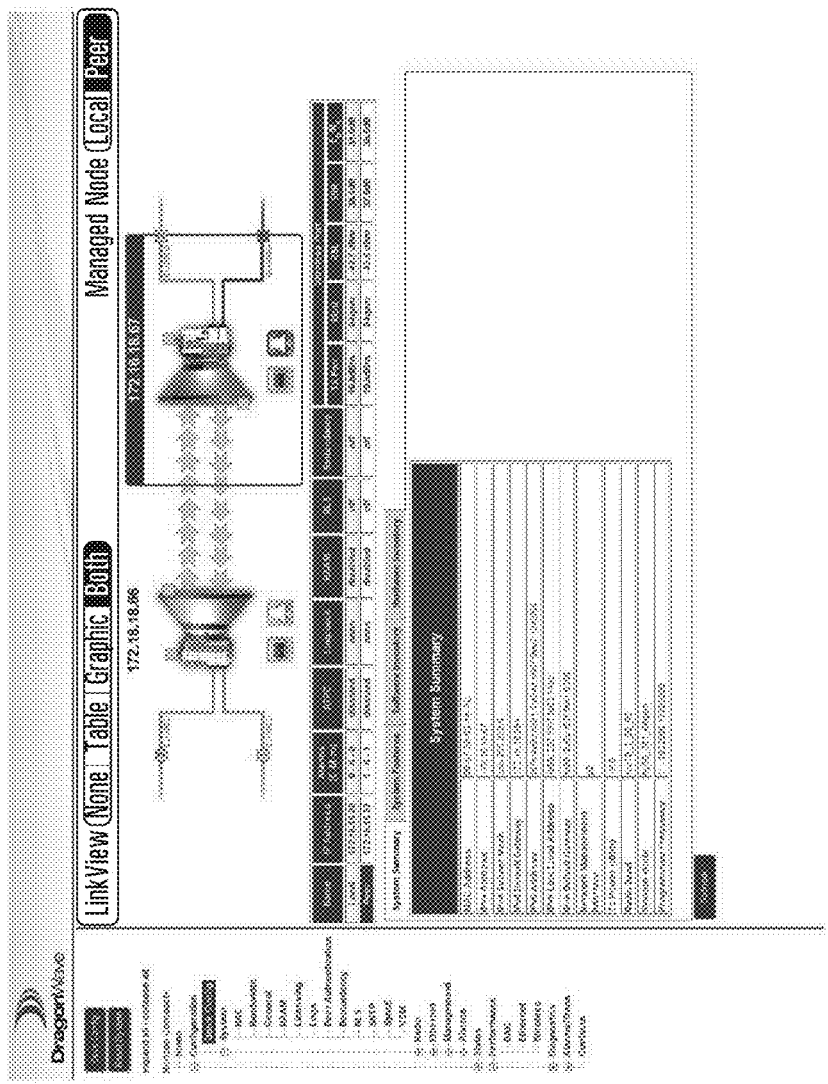

The example GUI in FIG. 29 is similar to FIG. 14A, but like the example GUI in FIG. 28 includes both IPv4 and IPv6 information in the System Summary. In FIGS. 30 and 31, the example GUIs are similar to FIG. 29, without the port details for the Ethernet 2 port handle at the peer communication node, but with the local and peer communication nodes respectively selected.

The type of IP address information in the Table view, and also or instead in the Graphic view, could depend on how a user connects to a communication node. As described herein, a user could connect to a communication node by launching a web connection to the node or creating a web session with a node. If the web connection or session is established using an IPv4 address for the communication node, then the Table view could display IPv4 information, and/or the address as shown in the Graphic view could be an IPv4 address, as shown in FIGS. 29 to 31. IPv6 information could be shown instead of IPv4 information in the Table view and/or the Graphic view if the web connection or session is established using an IPv6 address.

Figure 32:
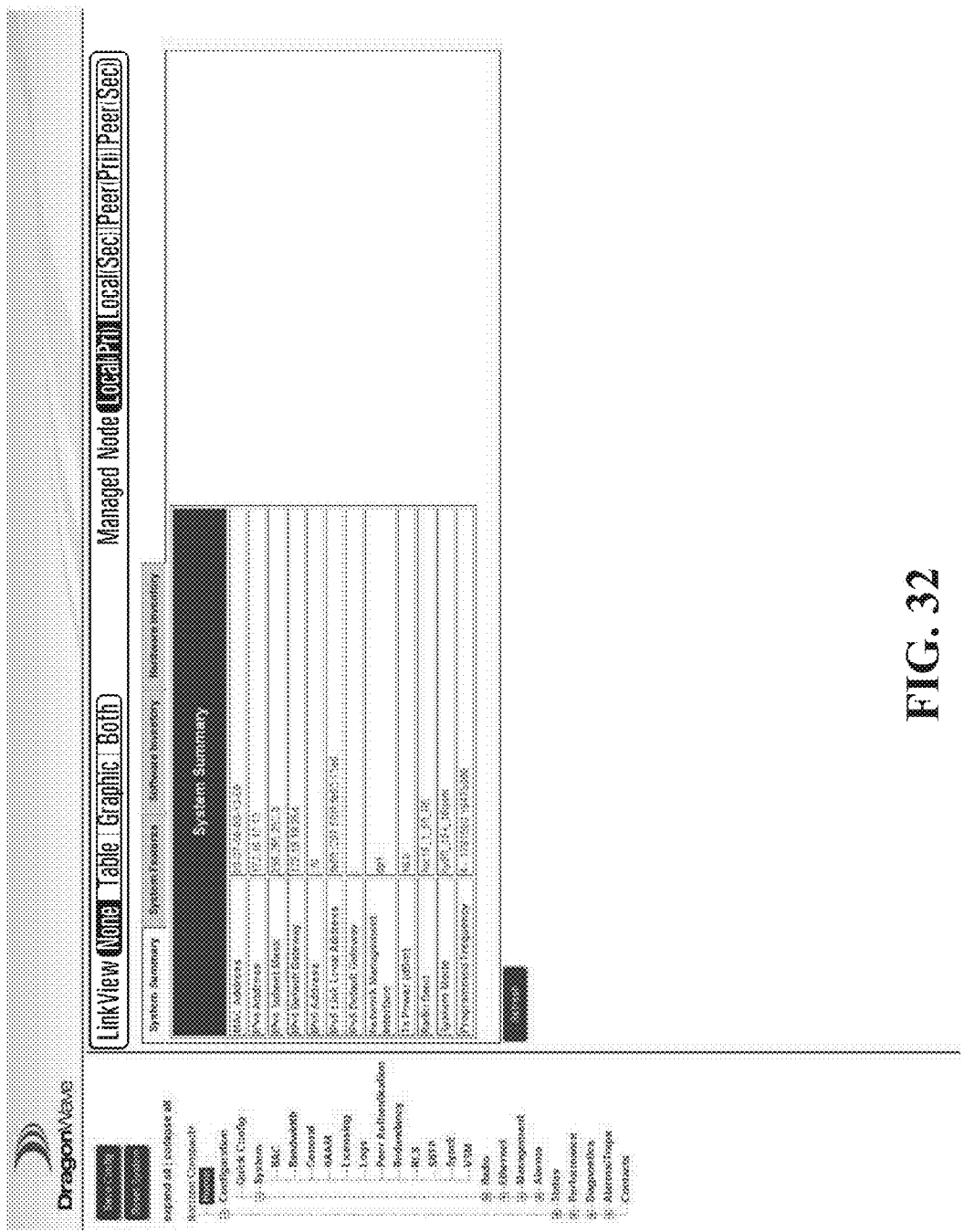

FIG. 32 shows a GUI that would be similar to the GUI for the None view for the example GUI in FIG. 21. Again, the System Summary includes both IPv4 and IPv6 information for the selected node. The Managed Node graphical elements in FIG. 32 are also different from those in FIG. 21, with indications of local primary and secondary (instead of local and partner) and peer primary and secondary (instead of peer and peer partner) communication nodes.

Figure 33:
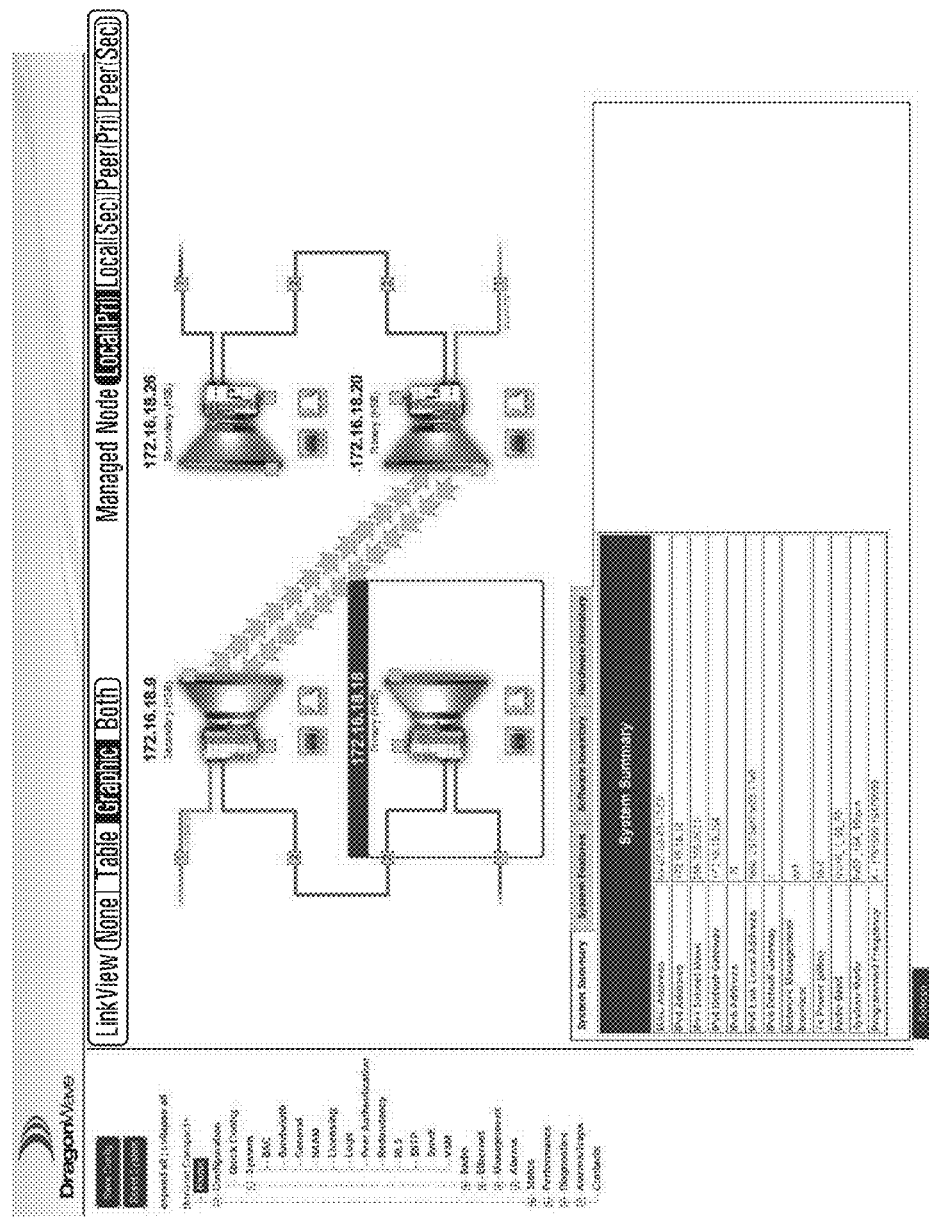

In the Graphic view shown in FIG. 33, local primary and secondary communication nodes and peer primary and secondary communication nodes are shown, with a System Summary for the selected local primary node including both IPv4 and IPv6 information. The example GUI shown in FIG. 33 illustrates an additional graphical element that could be provided to indicate features which have been enabled at each communication node. Below each node address, there is an additional indicator of "Primary (HSB)" or "Secondary (HSB)" in this example. These additional indicators provide a user with an indication that redundancy protection or "Hot StandBy" (HSB) is currently enabled at each communication node, and whether each communication node is the primary or secondary communication node for the purposes of redundancy protection. Other indicators might also or instead be provided, for such features as HAAM, ATPC, Loopback, RLS. There might also or instead be other redundancy mode indicators, such as Primary (×2) and Secondary (×2) to indicate that link aggregation has been enabled.

In the example shown in FIG. 33, there is a wireless communication link between the local secondary communication node and the peer primary communication node. This represents another possible mode of operation and another type of related communication link. Redundant communication links between local/peer communication nodes and between partner/peer partner communication nodes are described above. FIG. 33 illustrates that the partner communication node (referred to in this example as a secondary communication node) need not necessarily communicate only with a peer partner communication node. If a wireless communication link goes down due to a failure at a primary communication node, then a redundancy mechanism could cause a protection switch from the primary communication node's wireless link to the secondary communication node's wireless link, without changing the state of the communication node at the other end of the wireless link.

The wireless communication link shown in FIG. 33 might result from a protection switch from the local primary communication node to the local secondary communication node, for example, if the local primary communication node fails. In another protection mechanism, only the wireless link is switched. If the wireless communication link fails, then the local primary communication node could remain Active, and communication traffic could still be received by the local primary communication node but forwarded to the local secondary communication node for wireless transfer to the peer primary communication node as shown. The wireless communication changes in this example, but the local and peer primary communication nodes remain Active.

Figure 34:
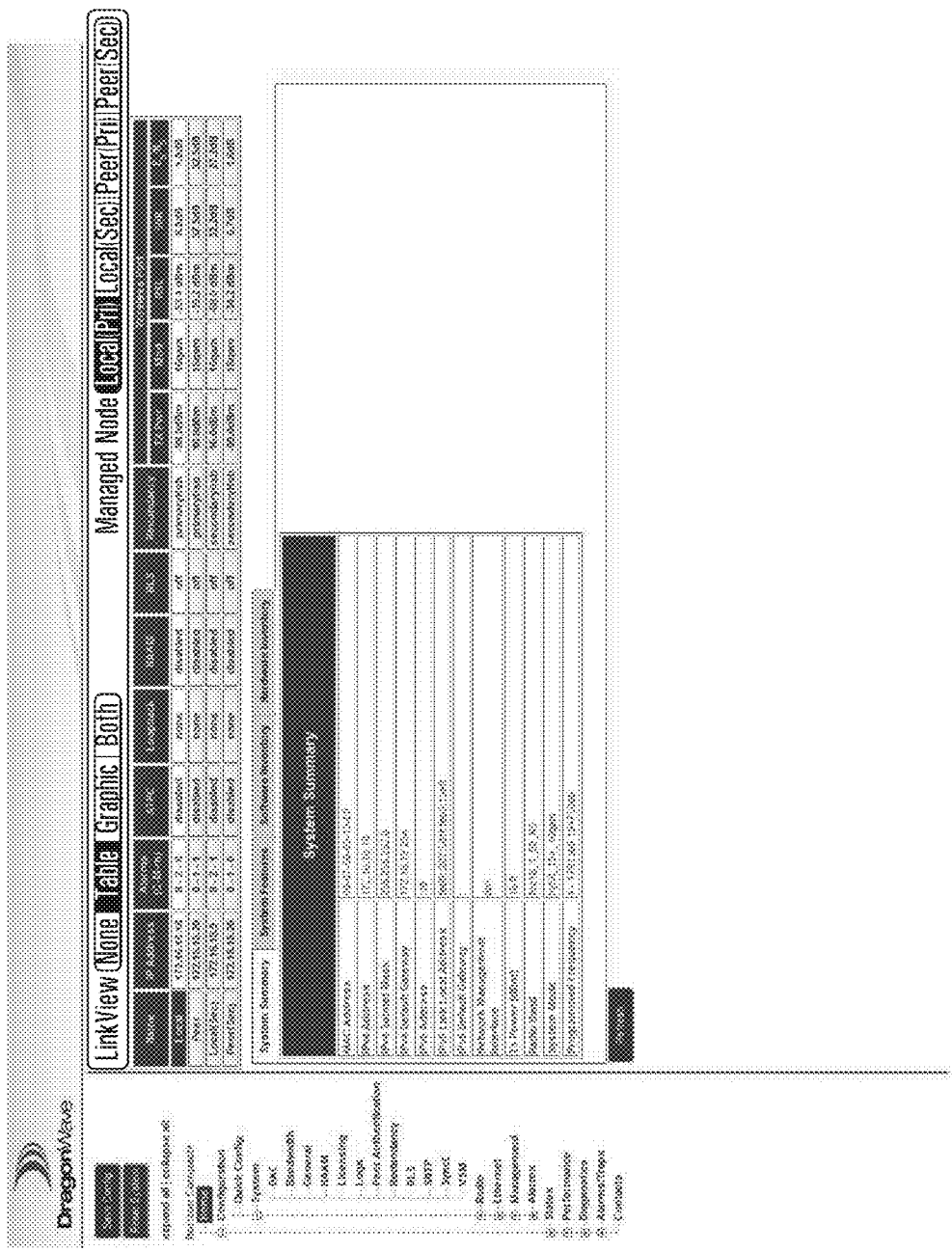

The example GUI in FIG. 34 is a Table view of the example GUI in FIG. 33.

Figure 35:
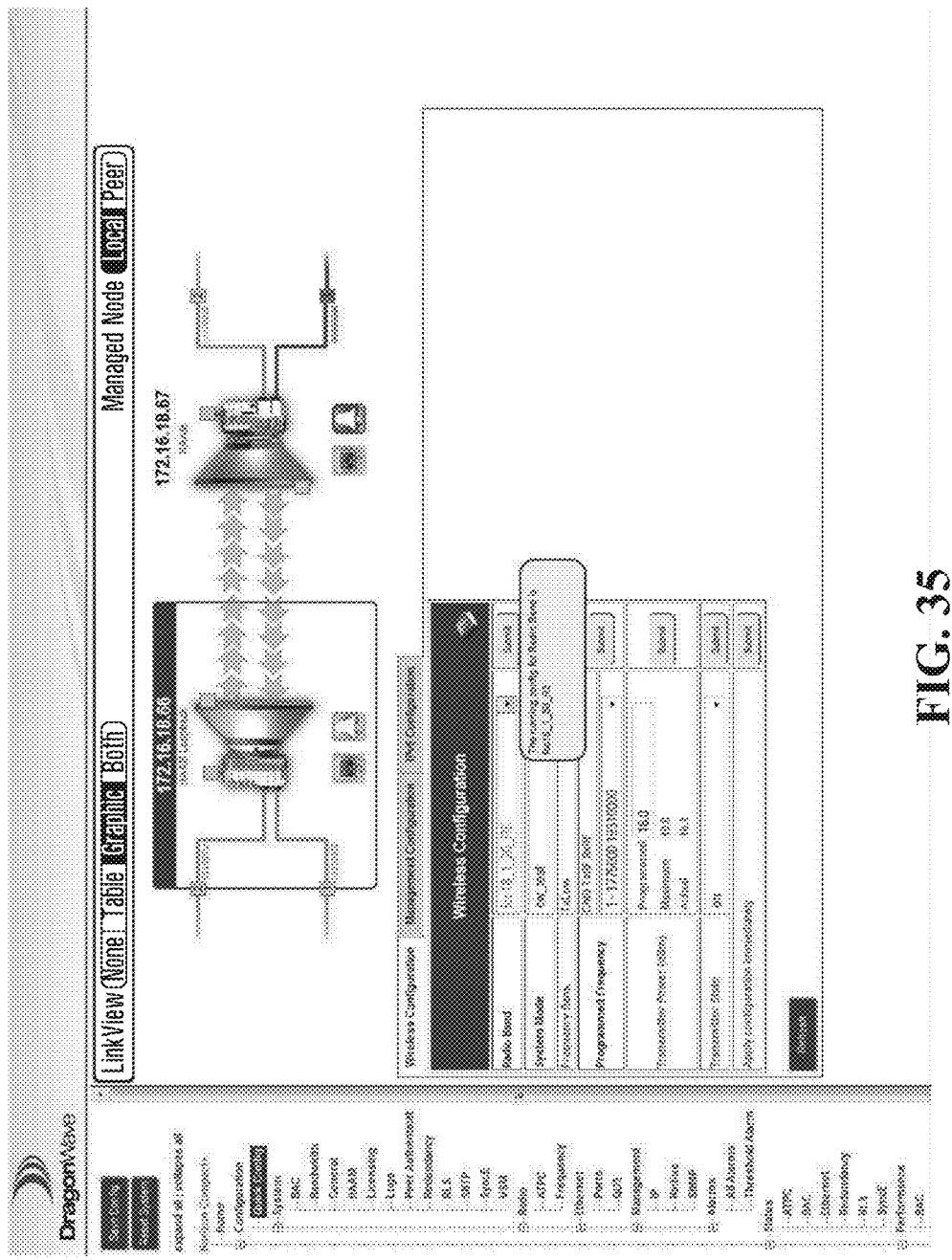

FIG. 35 is another example GUI, which illustrates how a user could be alerted to a user configuration that is different than the current configuration running in the actual communication system. Suppose that the current wireless configuration running at the communication node at IP address 172.16.18.66 specifies radio band "fcc18_1_50_R5", and the user wishes to reconfigure to radio band "fcc18_1_20_R5". When the user selects or otherwise enters the new radio band, it could be displayed in a color, such as red, to indicate that the change is not yet running at the communication node and thus is not consistent with the current configuration. In the example shown, when the user hovers a GUI pointer over the "Radio Band" entry, with the value in red in this example, a dialog box opens. The dialog box includes the value of the running configuration (i.e., what the actual hardware is currently programmed to run).

Some configuration entities can be applied dynamically on the communication system, and others might require a reset. If the user applies the configuration dynamically, using the Submit button next to "Apply configuration immediately" in the example shown in FIG. 35, then the value of the running configuration and the user configuration will be the same and the radio band value will revert back to its normal color, such as black. However, some entities cannot be applied "on the fly" and require a communication node or system reset. Enabling/disabling redundancy or HAAM features, for example, might fall into this category. While a user can change configurations for such features, for the duration that an affected communication node is up, the configuration mismatch is indicated (in red in this example) until a reset. The next time the communication node comes up, the feature is enabled or disabled and the new and now running configuration will default back to normal display, which is black in this example.

Many features in the example GUIs as shown in the drawings are described in detail above. These GUIs, and a complete communication system management implementation, could include many other features as well. The example GUIs include, at their left hand side, graphical elements in the form of buttons and a tree hierarchy that could be used for navigation and various management functions. These include at least the following, and others could be included in other embodiments, as sub-items under any of the tree elements and/or as separate graphical elements:

Save Config button—saves the user configurations on the selected communication node Reset System button—resets the selected communication node Home—navigates to a view as shown in many of the drawings Configuration—this is a folder name where all the user configurable pages are accessible Quick Config—provides a set of tabs including at least the minimal configurations on communication nodes before a communication link can be brought up; the order in which entries are set under the wireless configuration tab (FIG. 35) is important so on this tab a Submit is required at every stage before the next set of options are populated System BAC—configurations for bandwidth accelerator Bandwidth—configurations for system speed and upgrade/downgrade of the system speed General—generic configrations for system name/location/date/time HAAM—configurations for Hitless Automatic Adaptive Modulation Licensing—upgrade and downgrade of 5 main feature groups in one embodiment, including RLS, EOAM/ECFM (Ethernet Operations, Administration, and Maintenance/Ethernet Connectivity Fault Management), HAAM, BAC and Data Encryption Logs—configurations related to performance and system logs Peer Authentication—air authentication-specific configurations for peer communication node Redundancy—configurations for basic redundancy, partner discovery, link switch and link monitor parameters RLS—Rapid Link Shutdown configurations SNTP—Configurations for a Simple Network Time Protocol (SNTP) server SyncE—Synchronous Ethernet configurations VSM—ECFM Bandwidth VSM (Vendor Specific Message)-specific settings Radio
- ATPC—configurations for Adaptive Transmit Power Control
- Frequency—basic radio settings for bringing up a wireless communication link Ethernet
- Port—Ethernet configurations for communication node Ethernet ports
- QOS—Ethernet Quality Of Service, CoS (Class of Service) mapping, CoS CIR (Committed Information Rate), CoS CBS (Committed Burst Size), CoS WFQ (Weighted Fair Queuing) and CoS User flow settings Management
- IP—basic configurations for setting up IPv4 and IPv6 addresses and VLAN (Virtual Local Area Network) configurations
- Radius—Radius server configurations
- SNMP—SNMP managers and Trap Host-specific settings and enabling/disabling the traps Alarms—configurations for all system alarms and the threshold alarms Status—status pages for ATPC, BAC, Ethernet, Redundancy, RLS and SyncE features Performance (and its sub-items)
- BAC—statistics for all Queues Bandwidth Acceleration
- Ethernet—per port and Aggregate statistics of Ethernet ports
- Wireless—wireless statistics for local and peer wireless port and Aggregate wireless stats Diagnostics—HAAM and loopback diagnostics Alarms/Traps—active system alarms and trap history pages Contacts—support information.

Navigation through other screens may also or instead be provided through tabs and/or other graphical elements, such as the System Features, Software Inventory, and Hardware Inventory tabs next to the System Summary tab in may of the example GUIs.

It should also be appreciated that information could be presented in other forms than explicitly shown in the drawings. For example, given that push connections or WebSocket technology could be used to provide for real-time changes in data to be uploaded to a web browser from the communication nodes, real-time data such as RSL (Receive Signal Level) values that change quite often could be received on a web browser and plotted in graphical form to the user using the same push connection or socket. The user would be able to see the changes in RSL plotted on a graph, for instance, with time on the horizontal axis and the RSL values on the vertical axis. This data could represent the RSL changes over some time period, such as 24 hours, and/or some other predetermined or user configurable time period.

In addition, although described primarily in the context of methods and systems, other implementations are also contemplated, as instructions stored on a non-transitory computer-readable medium, for example.

We claim:

1. A communication network management system comprising:
a management interface implemented with hardware that supports communications with communication nodes and that enables management information to be exchanged with a node management module at a communication node over a connection with the communication node;
a communication link management module, implemented using hardware, firmware, or processing elements, that exchanges the management information with the node management module at the communication node, the management information comprising management information associated with the communication node and management information associated with a peer communication node that communicates with the communication node through a communication link, to manage both the communication node and the peer communication node through the connection with the communication node;
a display operatively coupled to the communication link management module,
the communication link management module being configured to provide on the display a Graphical User Interface (GUI) comprising:
a first graphical element representing the communication node;
a second graphical element representing the peer communication node; and
a third graphical element indicating a communication port of that the communication node that is a source port of a current management session for managing the communication node and the peer communication node, and is currently being used to exchange the management information with the management system.

2. The communication network management system of claim 1, the first and second graphical elements enabling switching between the communication node and the peer communication node as a managed node for viewing and changing node configuration, the communication link management module being configured to maintain a context of a view for the managed node in switching between the communication node and the peer communication node.

3. The communication network management system of claim 1, the management information comprising configuration information for changing configurations of the communication node and the peer communication node.

4. The communication network management system of claim 1, the connection comprising a HyperText Transfer Protocol (HTTP) connection or a Secure HTTP (HTTPS) connection.

5. The communication network management system of claim 4, the communication link management module being further configured to provide a WebCLI module to enable configuration of the communication node and the peer communication node via Command Line Interface (CLI) over the connection.

6. The communication network management system of claim 1, the management information further comprising management information associated with a partner communication node and a peer partner communication node that provide a related communication link that is related to the communication link.

7. The communication network management system of claim 1, the GUI further comprising graphical elements for viewing and changing communication node configuration items, and a further graphical element for applying changes in communication node configurations, the communication link management module being configured to make the further graphical element unavailable for user selection unless a communication node configuration item is changed.

8. The communication network management system of claim 7, the communication link management module being configured to control an appearance of the further graphical element after a communication node configuration item is changed, to provide an indication of whether the changed configuration item has been applied.

9. The communication network management system of claim 7, the communication link management module being configured to control an appearance of a graphical element for a changed communication node configuration item, to provide an indication of whether the changed communication node configuration item has been applied.

10. The communication network management system of claim 1, the GUI further comprising graphical elements for viewing and changing communication node configuration items, the communication link management module being configured to dynamically update the graphical element for a changed communication node configuration item.

11. The communication network management system of claim 10, the communication link management module being configured to control an appearance of the graphical element for the changed communication node configuration item, to provide an indication that the graphical element has been updated.

12. The communication network management system of claim 1, the GUI further comprising graphical elements for viewing and changing communication node configuration items, the communication link management module being configured to control an appearance of the graphical element for a changed communication node configuration item, to provide an indication of a configuration mismatch between a communication node configuration running on a communication node and a changed communication node configuration item displayed in the graphical element.

13. The communication network management system of claim 1, wherein the communication link is a wireless communication link, wherein the GUI further comprises a fourth graphical element indicating that the peer communication node is currently being managed through the communication node and the wireless communication link.

14. The communication network management system of claim 1, the GUI further comprising graphical elements displayed in colors indicating whether communication traffic is currently being transmitted by the communication node and the peer communication node over the communication link.

15. A communication system comprising:
a management system, the management system comprising a management interface that enables management information to be exchanged with a communication node over a connection with the communication node; a communication link management module that exchanges the management information with the communication node, the management information comprising management information associated with the communication node and management information associated with a peer communication node that communicates with the communication node through a communication link, to manage both the communication node and the peer communication node through a connection with the communication node; and a display operatively coupled to the communication link management module, the communication link management module being configured to provide on the display a Graphical User Interface (GUI) comprising: a first graphical element representing the communication node; a second graphical element representing the peer communication node; and a third graphical element indicating a communication port of the communication node that is a source port of a current management session for managing the communication node and the peer communication node, and is currently being used to exchange the management information with the management system; and
a plurality of communication nodes, the plurality of communication nodes comprising at least the communication node and the peer communication node,
the management system managing the communication node and the peer communication node through the connection with the communication node.

16. The communication system of claim 15, the plurality of communication nodes further comprising:
a partner communication node and a peer partner communication node that provide a related communication link that is related to the communication link,
the management system managing the communication node, the peer communication node, the partner communication node, and the peer partner communication node through the connection with the communication node.

17. A method comprising:
establishing a connection between a communication network management system and a communication node that participates in a communication link with another communication node;
exchanging management information between the management system and a node management module at the communication node over the connection, the management information comprising management information associated with the communication node and management information associated with the other communication node, to manage both the communication node and the peer communication node through the connection with the communication node;
providing on a display a Graphical User Interface (GUI) comprising:
a first graphical element representing the communication node;
a second graphical element representing the peer communication node; and
a third graphical element indicating a communication port of the communication node that is a source port of a current management session for managing the communication node and the peer communication node, and is currently being used to exchange the management information with the management system.

18. The method of claim 17, the connection comprising a HyperText Transfer Protocol (HTTP) connection or a Secure HTTP (HTTPS) connection.

19. A non-transitory computer-readable medium storing instructions which when executed perform the method of claim 17.

* * * * *